United States Patent
Li

(10) Patent No.: US 12,062,138 B2
(45) Date of Patent: Aug. 13, 2024

(54) TARGET DETECTION METHOD AND APPARATUS

(71) Applicant: HUAWEI TECHNOLOGIES CO., LTD., Guangdong (CN)

(72) Inventor: Hongmin Li, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 81 days.

(21) Appl. No.: 17/985,376

(22) Filed: Nov. 11, 2022

(65) Prior Publication Data

US 2023/0072289 A1 Mar. 9, 2023

Related U.S. Application Data

(63) Continuation of application No. PCT/CN2020/090022, filed on May 13, 2020.

(51) Int. Cl.
*G06T 17/20* (2006.01)
*G06T 7/73* (2017.01)

(52) U.S. Cl.
CPC .............. *G06T 17/20* (2013.01); *G06T 7/73* (2017.01); *G06T 2210/12* (2013.01); *G06T 2210/56* (2013.01)

(58) Field of Classification Search
CPC ....... G06T 7/73; G06T 17/20; G06T 2210/12; G06T 2210/56
See application file for complete search history.

(56) References Cited

U.S. PATENT DOCUMENTS

2015/0254499 A1  9/2015  Pang et al.
2016/0154999 A1  6/2016  Fan et al.
(Continued)

FOREIGN PATENT DOCUMENTS

CN  107463918 A  12/2017
CN  109188457 A  1/2019
(Continued)

OTHER PUBLICATIONS

Zheng et al., "Vehicle Detection in the Traffic Environment Based on the Fusion of Laser Point Cloud and Image Information," Chinese Journal of Scientific Instrument, vol. 40, No. 12, Dec. 2019, 9 pages (with English abstract).
Office Action in Chinese Appln. No. 202080005178.9, dated Jan. 11, 2022, 6 pages (with English translation).
Office Action in Chinese Appln. No. 202080005178.9, dated Sep. 8, 2021, 10 pages (with English translation).
(Continued)

*Primary Examiner* — Kee M Tung
*Assistant Examiner* — Jed-Justin Imperial
(74) *Attorney, Agent, or Firm* — Fish & Richardson P.C.

(57) ABSTRACT

A target detection method and apparatus are provided. A first image of a target scenario collected by an image sensor is analyzed to obtain one or more first 2D detection boxes of the target scenario, and a three-dimensional point cloud of the target scenario collected by a laser sensor is analyzed to obtain one or more second 2D detection boxes of the target scenario in one or more views (for example, a BEV and/or a PV). Then, comprehensive analysis is performed on a matching degree and confidence of the one or more first 2D detection boxes, and a matching degree and confidence of the one or more second 2D detection boxes, to obtain a 2D detection box of a target. Finally, a 3D model of the target is obtained based on a three-dimensional point corresponding to the 2D detection box of the target.

20 Claims, 11 Drawing Sheets

(56) References Cited

U.S. PATENT DOCUMENTS

| | | | |
|---|---|---|---|
| 2018/0137647 A1* | 5/2018 | Li | G06T 7/73 |
| 2021/0004566 A1* | 1/2021 | Qi | G06V 10/82 |
| 2021/0181351 A1* | 6/2021 | Ge | G01S 17/89 |
| 2021/0213973 A1* | 7/2021 | Carillo Peña | B60W 60/0011 |

FOREIGN PATENT DOCUMENTS

| | | |
|---|---|---|
| CN | 110543858 A | 12/2019 |
| CN | 110632608 A | 12/2019 |
| CN | 110674829 A | 1/2020 |
| CN | 110807385 A | 2/2020 |
| CN | 110827202 A | 2/2020 |
| CN | 110909623 A | 3/2020 |
| CN | 110929692 A | 3/2020 |
| CN | 110991468 A | 4/2020 |
| CN | 111046767 A | 4/2020 |
| CN | 111079685 A | 4/2020 |

OTHER PUBLICATIONS

International Search Report and Written Opinion in International Appln. No. PCT/CN2020/090022, mailed on Jan. 29, 2021, 17 pages (with English translation).

Barea et al., "Vehicle Detection and Localization using 3D Lidar Point Cloud and Image Semantic Segmentation," 2018 21 st International Conference on Intelligent Transportation Systems (ITSC), Maui, Hawaii, USA, Nov. 4-7, 2018, 6 pages.

Zhou et al., "VoxelNet: End-to-End Learning for Point Cloud Based 3D Object Detection," Proceedings of the IEEE Conference on Computer Vision and Pattern Recognition (CVPR), Salt Lake City, Jun. 2018, 10 pages.

Zhou et al., "End-to-End Multi-View Fusion for 3D Object Detection in LiDAR Point Clouds," Submitted on Oct. 23, 2019, arXiv: 1910.06528v2, 10 pages.

Extended European Search Report in European Appln No. 20934996. 8, dated May 19, 2023, 10 pages.

* cited by examiner

FIG. 3

TARGET DETECTION METHOD AND APPARATUS

CROSS-REFERENCE TO RELATED APPLICATIONS

This application is a continuation of International Application No. PCT/CN2020/090022, filed on May 13, 2020. The disclosure of which is hereby incorporated by reference in its entirety.

TECHNICAL FIELD

Embodiments of this application relate to the field of information processing technologies, and in particular, to a target detection method and apparatus, which can be specifically applied to self-driving, intelligent driving, the Internet of Vehicles, or the like.

BACKGROUND

Three-dimensional (3 dimensions, 3D) detection of a target is one of indispensable underlying technologies used in 3D perception scenarios such as a self-driving scenario and a robot navigation scenario. 3D detection requires accurate information such as a location, structure, and category of the target.

Usually, based on an image collected by an image sensor in the 3D perception scenario, one or more two-dimensional (2 dimensions, 2D) detection boxes that are in the image and that include one or more image features may be obtained, and then the information such as the location, structure, and category of the target is obtained based on the image feature in the obtained one or more 2D detection boxes.

However, according to the foregoing conventional method, a 2D detection box of a target outside a field of view (field of view, FOV) of the image sensor cannot be obtained. As a result, information such as a location, structure, and category of the target outside the FOV of the image sensor cannot be obtained. In addition, the foregoing conventional method depends heavily on an environmental factor. For example, in the case of a dark night, insufficient illumination, or rapid movement of the target, the target in the 3D perception scenario cannot be accurately detected.

SUMMARY

This application provides a target detection method and apparatus, to resolve a problem that a target cannot be accurately detected in target detection.

To achieve the foregoing objective, the following technical solutions are used in embodiments of this application.

According to a first aspect, a target detection method is provided. The method includes: obtaining a first image and a three-dimensional point cloud, where the first image is an image of a target scenario, and the three-dimensional point cloud is a three-dimensional point cloud of the target scenario; obtaining one or more first two-dimensional 2D detection boxes based on an image feature in the first image; projecting the three-dimensional point cloud to a preset view, where the preset view includes a bird eye view BEV and/or a perspective view PV; performing voxelization on the three-dimensional point cloud projected to the preset view, to obtain a plurality of voxels including one or more three-dimensional points; obtaining one or more second 2D detection boxes based on the obtained plurality of voxels; obtaining a 2D detection box of a target based on a matching degree and confidence of the one or more first 2D detection boxes and a matching degree and confidence of the one or more second 2D detection boxes; and obtaining a 3D model of the target based on a three-dimensional point corresponding to the 2D detection box of the target, where the confidence represents reliability of including a feature three-dimensional point by a corresponding first 2D detection box or second 2D detection box.

According to the technical solution provided in the first aspect, a first image of a target scenario collected by an image sensor is analyzed to obtain one or more first 2D detection boxes of the target scenario, and a three-dimensional point cloud of the target scenario collected by a laser sensor is analyzed to obtain one or more second 2D detection boxes of the target scenario in one or more views (for example, a bird eye view (bird view, BEV) and/or a perspective view (perspective view, PV)). Then, comprehensive analysis is performed on a matching degree and confidence of the one or more first 2D detection boxes, and a matching degree and confidence of the one or more second 2D detection boxes, to obtain a 2D detection box of a target. Finally, a 3D model of the target is obtained based on a three-dimensional point corresponding to the 2D detection box of the target. By using such a method, a problem of missing detection of a target by the image sensor due to a limited field of view (field of view, FOV) or an environmental factor (for example, a dark night, insufficient illumination, and rapid movement of the target) can be avoided.

In a possible implementation, the obtaining one or more second 2D detection boxes based on the obtained plurality of voxels includes: generating a voxel diagram based on a mapping relationship between the three-dimensional point cloud and the voxels; obtaining a voxel feature of each voxel corresponding to the voxel diagram, where the voxel feature represents one or more of the following: a quantity of preset feature three-dimensional points in the voxel, whether there is a preset feature three-dimensional point in the voxel, or mean coordinates of the preset feature three-dimensional points in the voxel; using a multi-dimensional tensor to represent the voxel diagram based on the voxel feature of each voxel corresponding to the voxel diagram; obtaining a spatial feature of each voxel corresponding to the voxel diagram; and obtaining the one or more second 2D detection boxes based on the spatial feature of each voxel. Feature analysis is performed on the obtained plurality of voxels, to obtain, based on a feature analysis result, candidate 2D detection boxes that may include a target feature. In this way, a problem of missing detection caused when the detection is performed only based on image analysis is avoided.

In a possible implementation, the obtaining a 3D model of the target based on a three-dimensional point corresponding to the 2D detection box of the target includes: obtaining a feature of the three-dimensional point corresponding to the 2D detection box of the target, to obtain a feature three-dimensional point corresponding to the 2D detection box of the target; performing a first operation on the feature three-dimensional point, where the first operation includes one or more of sampling, coordinate transformation, or foreground segmentation; and obtaining the 3D model of the target based on the feature three-dimensional point obtained by performing the first operation. Constructing the 3D model of the target based on an original three-dimensional point corresponding to the 2D detection box of the target can prevent loss of target-related information, to improve target detection accuracy.

In a possible implementation, the obtaining a 2D detection box of a target based on a matching degree and confidence of the one or more first 2D detection boxes and a matching degree and confidence of the one or more second 2D detection boxes includes: obtaining confidence rankings of the one or more first 2D detection boxes and the one or more second 2D detection boxes; and retaining the second 2D detection box and discarding the first 2D detection box after intersection over union IOU between each first 2D detection box and each second 2D detection box is calculated based on the confidence rankings, if a result is greater than a preset threshold, and confidence of a first 2D detection box is less than confidence of a second 2D detection box. The 2D detection box of the target is determined based on the 2D detection box obtained through image feature detection and the 2D detection box obtained through voxel feature detection. This can reduce a probability of missing detection of the target, and improve target detection accuracy.

In a possible implementation, the preset view includes the BEV view and the PV view; and the performing voxelization on the three-dimensional point cloud projected to the preset view, to obtain a plurality of voxels include: performing voxelization on the three-dimensional point cloud projected to the BEV view, to obtain a plurality of voxels of the BEV view; and performing voxelization on the three-dimensional point cloud projected to the PV view, to obtain a plurality of voxels of the PV view. By projecting the three-dimensional point cloud to different views, image feature analysis and voxel feature analysis in different views can be comprehensively considered to obtain the 2D detection box of the target, to reduce the probability of missing detection of the target and improve target detection accuracy.

In a possible implementation, the obtaining one or more second 2D detection boxes based on the obtained plurality of voxels includes: fusing the plurality of voxels of the BEV view and the plurality of voxels of the PV view; and obtaining the one or more second 2D detection boxes based on a voxel obtained through fusion. In this solution, the voxels of different views can be fused to perform feature analysis, to obtain, based on a feature analysis result, the candidate 2D detection boxes that may include the target feature.

In a possible implementation, the obtaining one or more second 2D detection boxes based on the obtained plurality of voxels includes: obtaining one or more second 2D detection boxes of the BEV view based on the plurality of voxels of the BEV view; and obtaining one or more second 2D detection boxes of the PV view based on the plurality of voxels of the PV view; and the obtaining a 2D detection box of a target based on a matching degree and confidence of the one or more first 2D detection boxes and a matching degree and confidence of the one or more second 2D detection boxes includes: obtaining a first target 2D detection box based on the matching degree and the confidence of the one or more first 2D detection boxes and a matching degree and confidence of the one or more second 2D detection boxes of the BEV view; and obtaining a second target 2D detection box based on the matching degree and the confidence of the one or more first 2D detection boxes and a matching degree and confidence of the one or more second 2D detection boxes of the PV view; and obtaining the 2D detection box of the target based on the first target 2D detection box and the second target 2D detection box. In this solution, the candidate 2D detection boxes that may include the target feature are obtained based on the voxels of different views, and candidate target 2D detection boxes corresponding to different views are comprehensively analyzed to obtain the target 2D detection box.

In a possible implementation, the 2D detection box of the target is the first target 2D detection box or the second target 2D detection box. In this solution, a candidate target 2D detection box can be selected from the candidate target 2D detection boxes corresponding to different views as the 2D detection box of the target.

In a possible implementation, the obtaining the 2D detection box of the target based on the first target 2D detection box and the second target 2D detection box includes: fusing the first target 2D detection box and the second target 2D detection box to obtain the 2D detection box of the target. In this solution, the 2D detection box of the target can be obtained by fusing the candidate target 2D detection boxes corresponding to different views.

In a possible implementation, the 3D model of the target at least represents one or more of a location, a structure, or a category of the target.

According to a second aspect, a target detection apparatus is provided. The apparatus includes: an obtaining unit configured to obtain a first image and a three-dimensional point cloud, where the first image is an image of a target scenario, and the three-dimensional point cloud is a three-dimensional point cloud of the target scenario; and a processing unit configured to obtain one or more first 2D detection boxes based on an image feature in the first image; project the three-dimensional point cloud to a preset view; perform voxelization on the three-dimensional point cloud projected to the preset view, to obtain a plurality of voxels including one or more three-dimensional points; obtain one or more second 2D detection boxes based on the plurality of voxels; obtain a 2D detection box of a target based on a matching degree and confidence of the one or more first 2D detection boxes and a matching degree and confidence of the one or more second 2D detection boxes; and obtain a 3D model of the target based on a three-dimensional point corresponding to the 2D detection box of the target, where the preset view includes a bird eye view BEV and/or a perspective view PV, and the confidence represents reliability of including a feature three-dimensional point by a corresponding first 2D detection box or second 2D detection box.

According to the technical solution provided in the second aspect, the target detection apparatus obtains, by analyzing a first image of a target scenario collected by an image sensor, one or more first 2D detection boxes of the target scenario, and obtains, by analyzing a three-dimensional point cloud of the target scenario collected by a laser sensor, one or more second 2D detection boxes of the target scenario in one or more views (for example, the BEV and/or the PV). Then, comprehensive analysis is performed on a matching degree and confidence of the one or more first 2D detection boxes, and a matching degree and confidence of the one or more second 2D detection boxes, to obtain a 2D detection box of a target. Finally, a 3D model of the target is obtained based on a three-dimensional point corresponding to the 2D detection box of the target. By using such a method, a problem of missing detection of a target due to a limited FOV or an environmental factor (for example, a dark night, insufficient illumination, and rapid movement of the target) can be avoided.

In a possible implementation, that the processing unit obtains one or more second 2D detection boxes based on the plurality of voxels includes: The processing unit generates a voxel diagram based on a mapping relationship between the three-dimensional point cloud and the voxels; the processing unit obtains a voxel feature of each voxel corresponding to the voxel diagram, where the voxel feature represents one or more of the following: a quantity of preset feature three-dimensional points in the voxel, whether there is a preset feature three-dimensional point in the voxel, or mean coordinates of the preset feature three-dimensional points in the voxel; the processing unit uses a multi-dimensional tensor to represent the voxel diagram based on the voxel feature of each voxel corresponding to the voxel diagram; the processing unit obtains a spatial feature of each voxel corresponding to the voxel diagram; and the processing unit obtains the one or more second 2D detection boxes based on the spatial feature of each voxel. Feature analysis is performed on the obtained plurality of voxels, to obtain, based on a feature analysis result, candidate 2D detection boxes that may include a target feature. In this way, a problem of missing detection caused when the detection is performed only based on image analysis is avoided.

In a possible implementation, that the processing unit obtains a 3D model of the target based on a three-dimensional point corresponding to the 2D detection box of the target includes: The processing unit obtains a feature of the three-dimensional point corresponding to the 2D detection box of the target, to obtain a feature three-dimensional point corresponding to the 2D detection box of the target; the processing unit performs a first operation on the feature three-dimensional point, where the first operation includes one or more of sampling, coordinate transformation, or foreground segmentation; and the processing unit obtains the 3D model of the target based on a feature three-dimensional point obtained by performing the first operation. Constructing the 3D model of the target based on an original three-dimensional point corresponding to the 2D detection box of the target can prevent loss of target-related information, to improve target detection accuracy.

In a possible implementation, that the processing unit obtains a 2D detection box of a target based on a matching degree and confidence of the one or more first 2D detection boxes and a matching degree and confidence of the one or more second 2D detection boxes includes: The processing unit obtains confidence rankings of the one or more first 2D detection boxes and the one or more second 2D detection boxes; and the processing unit retains the second 2D detection box and discards the first 2D detection box after IOU between each first 2D detection box and each second 2D detection box is calculated based on the confidence rankings, if a result is greater than a preset threshold, and confidence of a first 2D detection box is less than confidence of a second 2D detection box. The 2D detection box of the target is determined based on the 2D detection box obtained through image feature detection and the 2D detection box obtained through voxel feature detection. This can reduce a probability of missing detection of the target, and improve target detection accuracy.

In a possible implementation, the preset view includes the BEV view and the PV view; and that the processing unit performs voxelization on the three-dimensional point cloud projected to the preset view, to obtain a plurality of voxels includes: The processing unit performs voxelization on the three-dimensional point cloud projected to the BEV view, to obtain a plurality of voxels of the BEV view; and the processing unit performs voxelization on the three-dimensional point cloud projected to the PV view, to obtain a plurality of voxels of the PV view. By projecting the three-dimensional point cloud to different views, image feature analysis and voxel feature analysis in different views can be comprehensively considered to obtain the 2D detection box of the target, to reduce the probability of missing detection of the target and improve target detection accuracy.

In a possible implementation, that the processing unit obtains one or more second 2D detection boxes based on the plurality of voxels includes: The processing unit fuses the plurality of voxels of the BEV view and the plurality of voxels of the PV view; and the processing unit obtains the one or more second 2D detection boxes based on a voxel obtained through fusion. In this solution, the voxels of different views can be fused to perform feature analysis, to obtain, based on a feature analysis result, the candidate 2D detection boxes that may include the target feature.

In a possible implementation, that the processing unit obtains one or more second 2D detection boxes based on the plurality of voxels includes: The processing unit obtains one or more second 2D detection boxes of the BEV view based on the plurality of voxels of the BEV view; and obtains one or more second 2D detection boxes of the PV view based on the plurality of voxels of the PV view; and that the processing unit obtains a 2D detection box of a target based on a matching degree and confidence of the one or more first 2D detection boxes and a matching degree and confidence of the one or more second 2D detection boxes includes: The processing unit obtains a first target 2D detection box based on the matching degree and the confidence of the one or more first 2D detection boxes and a matching degree and confidence of the one or more second 2D detection boxes of the BEV view; and obtains a second target 2D detection box based on the matching degree and the confidence of the one or more first 2D detection boxes and a matching degree and confidence of the one or more second 2D detection boxes of the PV view; and the processing unit obtains the 2D detection box of the target based on the first target 2D detection box and the second target 2D detection box. In this solution, the candidate 2D detection boxes that may include the target feature are obtained based on the voxels of different views, and candidate target 2D detection boxes corresponding to different views are comprehensively analyzed to obtain the target 2D detection box.

In a possible implementation, the 2D detection box of the target is the first target 2D detection box or the second target 2D detection box. In this solution, a candidate target 2D detection box can be selected from the candidate target 2D detection boxes corresponding to different views as the 2D detection box of the target.

In a possible implementation, that the processing unit obtains the 2D detection box of the target based on the first target 2D detection box and the second target 2D detection box includes: The processing unit obtains the 2D detection box of the target by fusing the first target 2D detection box and the second target 2D detection box. In this solution, the 2D detection box of the target can be obtained by fusing the candidate target 2D detection boxes corresponding to different views.

In a possible implementation, the 3D model of the target at least represents one or more of a location, a structure, or a category of the target.

According to a third aspect, a target detection apparatus is provided. The target detection apparatus includes: at least one memory, configured to store a computer program; and at least one processor, configured to execute the computer program, to enable the target detection apparatus to implement the method according to any possible implementation of the first aspect.

According to a fourth aspect, a computer-readable storage medium is provided, where the computer-readable storage medium stores computer program code, and when the computer program code is executed by a processing circuit or an integrated circuit, the method according to any possible implementation of the first aspect is implemented.

According to a fifth aspect, a chip system is provided. The chip system includes a processor and a memory, where the memory stores computer program code, and when the computer program code is executed by the processor, the method according to any possible implementation of the first aspect is implemented. The chip system may include a chip, or may include a chip and another discrete component.

According to a sixth aspect, a computer program product is provided. When the computer program product is run on a computer, the method according to any possible implementation of the first aspect is implemented.

According to a seventh aspect, a terminal device is provided. The terminal device may be a transportation vehicle, a satellite, or an intelligent device, for example, an unmanned aerial vehicle, a driverless vehicle, a ship, a satellite, or a robot. Alternatively, the terminal device may be integrated into a transportation vehicle, a satellite, or an intelligent device, for example, integrated into a vehicle, an airplane, a ship, a satellite, or a robot. The terminal device includes the target detection apparatus according to any possible implementation of the second aspect or the third aspect, or includes the computer-readable storage medium according to the fourth aspect, or includes the chip system according to the fifth aspect, or stores the computer program product according to the sixth aspect.

According to an eighth aspect, a system is provided. The system includes the target detection apparatus according to any implementation of the second aspect or the third aspect, and at least one of an image sensor and a laser sensor.

BRIEF DESCRIPTION OF DRAWINGS

FIG. 3 is a schematic diagram of performing feature extraction on a convolutional layer in a convolutional neural network according to an embodiment of this application;

DESCRIPTION OF EMBODIMENTS

Figure 1:
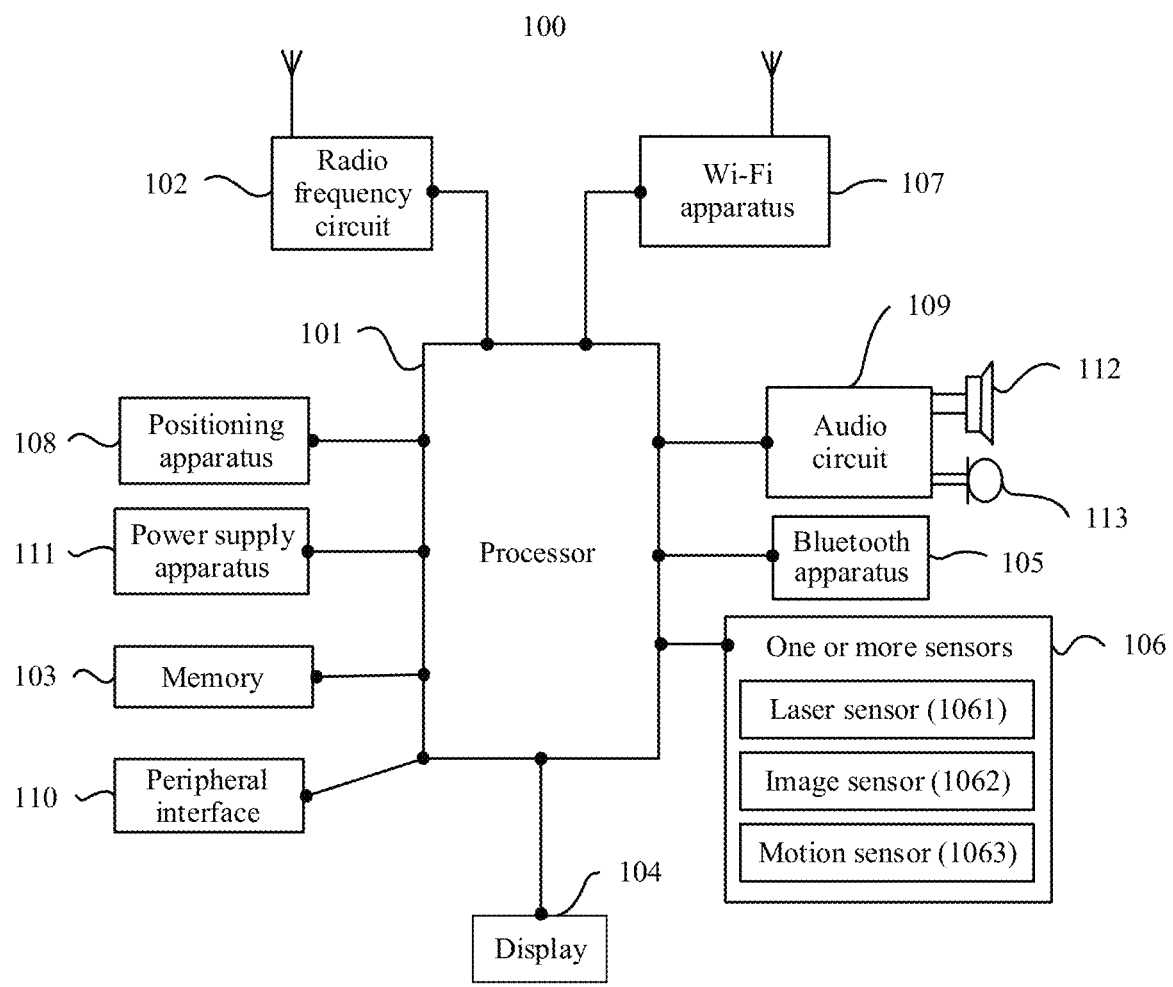
FIG. 1 is a schematic diagram of a hardware structure of a target detection apparatus according to an embodiment of this application.

Embodiments of this application provide a target detection method and apparatus, which can be applied to a three-dimensional (3 dimensions, 3D) environment perception scenario.

For example, the foregoing method may be applied to an advanced driver assistance system (advanced driving assistant system, ADAS) of a vehicle, an unmanned aerial vehicle, a satellite, or the like. According to the method, an ambient environment is perceived during movement of the vehicle, the unmanned aerial vehicle, or the satellite by using a laser sensor, an image sensor, or the like. When ambient environment perception is performed to recognize a target, an obstacle can be avoided. Consequently, comfort and safety of self-driving are improved.

For another example, the foregoing method may also be applied to a robot navigation system. According to the method, an ambient environment is perceived during movement of the robot by using a laser sensor, an image sensor, and the like. When ambient environment perception is performed to recognize a target, an obstacle can be avoided or an operation target can be determined. Consequently, work safety and work efficiency of the robot are improved.

For another example, the foregoing method may be applied to a medical device. According to the method, an ambient environment is perceived during movement of an operating apparatus (for example, an ultrasonic probe) by using a laser sensor, an image sensor, and the like. In this way, the operating apparatus or a movement direction of the operating apparatus can be controlled to provide diagnosis or treatment for a patient. Consequently, accuracy of medical device control can be improved, so that diagnosis can be more accurate, a treatment success rate can be improved, or the like.

Furthermore, the foregoing method may be applied to another 3D environment perception scenario. A specific application scenario is not limited in this embodiment of this application.

For ease of understanding, the following describes concepts and terms that may be used in this application.

A laser sensor is a sensor that uses a laser technology for measurement. A working principle of the laser sensor is described as follows. The laser sensor emits a laser pulse, receives partial light reflected by one or more reflection points of another object, and analyzes the received reflected light to detect a location, a structure, and the like of a target. For example, the laser sensor may be a LiDAR sensor.

The LiDAR sensor is a radar apparatus that detects features such as a location and a speed of a target by emitting a laser beam. A working principle of the laser radar is described as follows. First, a laser beam is emitted, and then a received echo reflected by a target is compared with the emitted laser beam and is processed, to obtain at least one of features of the target, such as a distance, a location, a height, a speed, a posture, and even a shape. In this way, detection, tracking, identification, and the like of a target can be achieved.

An image sensor, also referred to as a light-sensitive apparatus, is an apparatus that converts an optical image into an electronic signal. A working principle of the image sensor is first imaging an object illuminated by external light (or a self-luminous object) to obtain two-dimensional luminous intensity distribution (namely, an optical image), and then converting the optical image into a one-dimensional electrical time sequence signal. When amplification and synchronous control is performed on the one-dimensional time sequence signal, a two-dimensional optical image of the object can be obtained. In this way, image information of a target is obtained to detect, track, and recognize the target.

A bird eye view (bird eye view, BEV) is a three-dimensional graph drawn, based on the principle of perspective and high viewpoint perspective, from observation from a high viewing angle. Put simply, the bird eye view is a view looking down from a high place, and the bird eye view is more real than a floor plan. Specifically, the bird eye view is a view obtained by looking down, in a vertical direction, a laser point cloud in a Cartesian coordinate system.

A perspective view (perspective view, PV) is a view obtained through observation in a horizontal direction from a perspective in front of a laser point cloud that is converted from a Cartesian coordinate system into a spherical coordinate system.

A Cartesian coordinate system is obtained by drawing three axes that is intersecting at the point O and that is perpendicular to each other, O is used as the origin of the three axes, and length units of the three axes are the same. The three axes are an x axis (abscissa), a y axis (ordinate), and a z axis (applicate), which are collectively referred to as coordinate axes. Generally, the x axis and y axis are on a horizontal plane, and the z axis is perpendicular to the horizontal plane. The right-hand rule applies to positive directions of the x axis, y axis, and z axis. To be specific, the right hand wraps around the z axis, and when the other four fingers of the right hand rotate 90 degrees from the positive x axis to the positive y axis, the thumb points in the positive z direction. The x axis, y axis, z axis, and origin O form the Cartesian coordinate system.

A target detection method provided in this application may be applied to a target detection apparatus. The target detection apparatus may include one or more laser sensors (or a LiDAR sensor or a millimeter-wave radar), one or more image sensors, a memory, and a processor. In some possible structures, the target detection apparatus may further include other modules such as a radio frequency circuit, a display, and a loudspeaker.

The target detection apparatus may be installed on terminal devices such as a vehicle, a vessel, an airplane, an unmanned aerial vehicle, a robot, a satellite, or a medical device. The terminal device is also referred to as vehicle-mounted device or on-board device. Alternatively, the target detection apparatus may be terminal devices such as a desktop device, a laptop device, a handheld device, a wearable device, a smart home device, or a computing device. For example, the target detection apparatus may be a netbook, a tablet computer, a smart watch, an ultra-mobile personal computer (ultra-mobile personal computer, UMPC), a smart camera, a netbook, a personal digital assistant (personal digital assistant, PDA), a portable multimedia player (portable multimedia player, PMP), or an AR (augmented reality) device/VR (virtual reality) device.

In addition, the target detection apparatus may alternatively be a terminal device in an internet of things (internet of things, IoT) system. The IoT is an important part of future development of information technologies. A main technical feature of the IoT is to connect an object and a network by using a communication technology, to build an intelligent network characterized by human-machine connection and connection between all things. IoT technologies can achieve massive connections, deep coverage, and terminal power saving by using, for example, the narrow band (narrow band, NB) technology. A specific type, a structure, and the like of the target detection apparatus are not limited in this application.

Refer to FIG. 1. FIG. 1 is a schematic diagram of a hardware structure of a possible target detection apparatus according to an embodiment of this application. As shown in FIG. 1, the target detection apparatus 100 may include, but is not limited to, one or more of components such as at least one processor 101, a radio frequency circuit 102, a memory 103, a display 104, a Bluetooth apparatus 105, one or more sensors 106, a Wi-Fi apparatus 107, a positioning apparatus 108, an audio circuit 109, a peripheral interface 110, a power supply apparatus 111, a loudspeaker 112, and a microphone 113. Components included in the target detection apparatus may communicate with each other through one or more communication buses or signal cables, for example, a controller area network (controller area network, CAN) bus (not shown in FIG. 1). A person skilled in the art may understand that the hardware structure shown in FIG. 1 does not constitute a limitation on the target detection apparatus. The target detection apparatus may include more or fewer components than those shown in the figure, or some components are combined, or there are different component arrangements.

Each component of the target detection apparatus is specifically described below with reference to FIG. 1.

The processor 101 may be a control center of the target detection apparatus, and is connected to other parts of the target detection apparatus by using various interfaces and lines. The processor 101 performs various functions of the target detection apparatus by running or executing a computer program stored in the memory 103.

In some embodiments, the processor 101 may be a general-purpose central processing unit (central processing unit, CPU), a microprocessor, an application-specific integrated circuit (application-specific integrated circuit, ASIC), or one or more integrated circuits configured to control program execution of the solutions of this application. The processor 301 may include one or more CPUs.

In some embodiments, the processor 101 may further include a neural-network processing unit (neural-network processing unit, NPU) chip. The NPU is configured to quickly process input information by using a biological neural network structure such as a mode of transmission between human neurons, and may further constantly perform self-learning. The NPU can implement applications such as intelligent cognition of the target detection apparatus 100, for example, image recognition, facial recognition, scenario recognition, speech recognition, and text understanding. Specifically, in embodiments of this application, the NPU may be understood as a unit with a neural network (for example, a convolutional neural network (convolutional neural network, CNN)), or may be understood as a scenario recognition apparatus, or may be understood as a scenario recognition apparatus including an NPU, configured to recognize an image. In this embodiment of this application, the NPU chip may be configured to complete target detection processes such as first image analysis, three-dimensional point feature analysis, and 3D model construction by using a neural network (for example, a convolutional neural network) method.

In some embodiments, the NPU chip may have an algorithm accelerator, for example, a Cambricon Cambricon instruction set. The algorithm accelerator is configured to accelerate a processing speed of the target detection processes such as the image analysis, the three-dimensional point feature analysis, and the 3D model construction of the NPU chip.

The radio frequency circuit 102 may be configured to receive and send radio signals. Specifically, the radio frequency circuit 102 may receive downlink data of a base station, and send the downlink data to the processor 101 for processing. In addition, the radio frequency circuit 102 may further send uplink data to the base station.

Usually, the radio frequency circuit 102 includes, but is not limited to, an antenna, at least one amplifier, a transceiver, a coupler, a low noise amplifier, a duplexer, and the like. In addition, the radio frequency circuit 102 may further communicate with another device through wireless communication. The wireless communication may use any communication standard or protocol, including but not limited to a global system for mobile communication, a general packet radio service, code division multiple access, wideband code division multiple access, long term evolution, an e-mail, a short message service, and the like.

The memory 103 is configured to store the computer program, and may further be configured to store data. The memory 103 may be a read-only memory (read-only memory, ROM) or a random access memory (random access memory, RAM), or may be an electrically erasable programmable read-only memory (electrically erasable programmable read-only memory, EEPROM), a compact disc read-only memory (compact disc read-only memory, CD-ROM) or another compact disc storage device, an optical disc storage device (including a compact disc, a laser disc, an optical disc, a digital versatile disc, a Blu-ray disc, or the like), a magnetic disk storage medium or another magnetic storage device, or any other medium that can be used for carrying or storing program code and that can be accessed by a computer, but is not limited thereto.

The processor 101 may execute the various functions of the radio frequency circuit and perform data processing by running the computer program stored in the memory 103.

The memory 103 may include a program storage area and a data storage area. The program storage area may store an operating system and an application required by at least one function (for example, a sound playing function and an image playing function). The data storage area may store data (for example, image data and location information) created when the processor 101 is used.

The memory 103 may store a computer program for implementing a modular function, and execution of the computer program is controlled by the processor 101. The processor 101 is configured to execute the computer program stored in the memory 103, to implement the methods provided in the following embodiments of this application. In addition, the memory 103 may include a high-speed random access memory, and may further include a non-volatile memory such as a magnetic disk storage device, a flash memory device, another volatile solid storage device, or the like. The memory 103 may store various operating systems, for example, the iOS operating system and the Android operating system.

The display 104 is configured to display an image, a video, and the like. The display 104 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a mini-LED, a micro-LED, a micro-OLED, a quantum dot light emitting diode (quantum dot light emitting diode, QLED), or the like. In some embodiments, the target detection apparatus 100 may include one or N displays 104, where N is a positive integer greater than 1.

The target detection apparatus 100 may further include at least one or more sensors 106, including a laser sensor 1061, an image sensor 1062, a motion sensor 1063, other sensors such as an ambient light sensor.

A working principle of the laser sensor 1061 is as follows: The laser sensor 1061 emits a laser pulse, receives partial light reflected by one or more reflection points of another object, and records data of the reflected light. The data of the reflected light includes, but is not limited to, at least a time difference between laser emission and reception, an intensity difference between laser emission and reception, a yaw angle and a pitch angle of laser emission, and the like. The target detection apparatus 100 can achieve detection of a location, a structure, a speed, a posture, and the like of a target by analyzing the data of the reflected light, for example, by using the processor 101 to analyze the data of reflected light.

A working principle of the image sensor 1062 is first imaging an object illuminated by external light (or a self-luminous object) to obtain two-dimensional luminous intensity distribution (namely, an optical image), and then converting the optical image into a one-dimensional electrical time sequence signal. When amplification and synchronous control is performed on the one-dimensional time sequence signal, a two-dimensional optical image of the object can be obtained. In this way, image information of a target is obtained to detect, track, and recognize the target. In this embodiment of this application, the image sensor 1062 may be a camera.

In some embodiments, the processor 101 may further include a graphics processing unit (graphics processing unit, GPU), an image signal processor (image signal processor, ISP), a video codec, and a digital signal processor (digital signal processor, DSP). When the image sensor 1062 is a camera, the target detection apparatus 100 may implement photographing of the first image by using the ISP, the camera, the video codec, the GPU, the display 104, an application processor, and the like. In embodiments of this application, the GPU can be configured to perform 3D model construction, rendering, and the like.

The ISP is configured to process data fed back by the camera. For example, during photographing, when a shutter is open, light is transmitted to a photosensitive element of the camera through a lens. An optical signal is converted into an electrical signal. The photosensitive element of the camera transmits the electrical signal to the ISP for processing, and converts the electrical signal into a visible image. The ISP may further perform algorithm optimization on noise, luminance, and complexion of an image. The ISP may further optimize parameters such as exposure and a color temperature of a photographing scenario. In some embodiments, the ISP may be disposed in the camera.

The camera is configured to capture a static image or a video. An optical image of an object is generated by the lens, and the image is projected to the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP, so that the electrical signal is converted into a digital image signal. The ISP outputs the digital image signal to the DSP for processing. The DSP converts the digital image signal into an image signal in a standard format such as RGB or YUV.

The digital signal processor is configured to process a digital signal. In addition to processing a digital image signal, the digital signal processor may also process other digital signals. The video codec is configured to compress or decompress a digital video. The target detection apparatus 100 may support one or more video codecs. In this way, the target detection apparatus 100 can play or record videos in a plurality of encoding formats, for example, moving picture experts group (moving picture experts group, MPEG)-1, MPEG-2, MPEG-3, and MPEG-4.

The motion sensor may include an acceleration sensor, a gyro sensor, a magnetic sensor, or the like.

The acceleration sensor can be configured to detect a movement direction and a movement acceleration of the target detection apparatus 100. The acceleration sensor can detect magnitude and a direction of gravity when the target detection apparatus 100 is still, and can identify a posture of the target detection apparatus 100. The acceleration sensor is applied to applications such as a pedometer. The gyro sensor can be configured to determine a motion posture of the target detection apparatus 100. In some embodiments, a rotation direction and a rotation angular velocity of the target detection apparatus 100 can be determined by using the gyro sensor. The magnetic sensor is a device used for detecting corresponding physical parameters by converting magnetism variations of a sensitive element caused by external factors such as a magnetic field, a current, stress and strain, temperature, and light into electrical signals. In some embodiments, included angles between the target detection apparatus 100 and four directions: east, south, west, and north, can be measured by using the magnetic sensor. The ambient light sensor is configured to sense ambient light luminance. For example, the target detection apparatus 100 may determine, based on ambient luminance collected by the ambient light sensor, that a scenario of a current preview image is a dark night, and therefore supplementary lighting may be applied for photographing. A specific amount of supplementary light may also depend on the ambient luminance collected by the ambient light sensor.

In some embodiments, the target detection apparatus 100 may be further configured with other sensors such as a barometer, a hygrometer, a thermometer, and an infrared sensor. Details are not described herein.

The audio circuit 109, the loudspeaker 112, and the microphone 113 may provide an audio interface between a user and the target detection apparatus 100. The audio circuit 109 may convert received audio data into an electrical signal, and transmit the electrical signal to the loudspeaker 112. The loudspeaker 112 converts the electrical signal into a voice signal for output. In addition, the microphone 113 converts a collected voice signal into an electrical signal. The audio circuit 109 receives the electrical signal, converts the electrical signal into audio data, and outputs the audio data to the radio frequency circuit 102 so that the audio data can be sent, for example, to another device, or outputs the audio data to the memory 103 for further processing.

It should be understood that the hardware modules included in the target detection apparatus 100 shown in FIG. 1 are merely examples for description, and do not constitute any limitation on this application. In an actual application, the target detection apparatus 100 provided in this embodiment of this application may further include another hardware module interacting with the hardware modules in the figure, although not shown in FIG. 1. For example, the target detection apparatus 100 may further include other apparatuses such as a near field communication (near field communication, NFC) apparatus or a flash. This is not specifically limited herein.

A target detection method provided in this application may be applied to a target detection apparatus that has a structure in FIG. 1 or a similar structure. The following specifically describes a target detection method provided in embodiments of this application with reference to the accompanying drawings.

A target detection method is provided in an embodiment of this application. By using the target detection method, target detection accuracy can be improved when there are different environment factors, especially when the environment factors such as a dark night, insufficient illumination, and rapid movement of a target, are unfavorable to target detection. A basic principle of this method is as follows. First, a first image of a target scenario collected by an image sensor is analyzed to obtain one or more first 2D detection boxes of the target scenario, and a three-dimensional point cloud of the target scenario collected by a laser sensor is analyzed to obtain one or more second 2D detection boxes of the target scenario in one or more views (for example, a bird eye view (bird view, BEV) and/or a perspective view (perspective view, PV)). Then, a matching degree and confidence of the one or more first 2D detection boxes are comprehensively analyzed, and a matching degree and confidence of one or more second 2D detection boxes are comprehensively analyzed, to obtain a 2D detection box of the target. Finally, a 3D model of the target is obtained based on three-dimensional point corresponding to the 2D detection box of the target.

The following specifically describes the target detection method provided in this embodiment of this application by using the target detection apparatus 100 with the structure shown in FIG. 1 as an example.

It should be noted that intrinsic and extrinsic parameters and coordinates transformation matrices of the image sensor 1062 and the laser sensor 1061 in this embodiment of this application are calibrated in advance. For example, the image sensor 1062 is a camera, and intrinsics (also referred to as intrinsic parameters) of the camera are represented by a 3*3 intrinsic parameter matrix K:

$$K = \begin{pmatrix} f_x & s & x0 \\ 0 & f_y & y0 \\ 0 & 0 & 1 \end{pmatrix},$$

where $f_x$ and $f_y$ are respective focal lengths of x and y directions of the camera coordinate system with pixel being a unit, x0 and y0 are coordinates of a principal point (relative to an image plane), and s is a coordinate axis tilt parameter. Ideally, a value of s is 0.

Extrinsics (also referred to as extrinsic parameters) of the camera are represented by a 3*3 rotation matrix R and a translation vector T. The rotation matrix R describes directions of coordinate axes of the world coordinate system relative to coordinate axes of the camera coordinate system. The translation vector T describes a position of a spatial origin in the camera coordinate system.

For example, the rotation matrix $$R = \begin{bmatrix} r_{11} & r_{12} & r_{13} \\ r_{21} & r_{22} & r_{23} \\ r_{31} & r_{32} & r_{33} \end{bmatrix};$$

and the translation vector $T=[t_x\ t_y\ t_z]^T$.

The coordinate transformation matrix refers to transformation relationships between a world coordinate axis, camera coordinate axis, image plane coordinate axis, and pixel coordinate axis. For example, if coordinates of a three-dimensional point in the world coordinate system are $P_w = (x_w, y_w, z_w)^T$, and coordinates of the three-dimensional point in the camera coordinate system are $P_c = (x_c, y_c, z_c)^T$, and then $$P_c = \begin{bmatrix} R & T \\ 0 & 1 \end{bmatrix} P_w.$$

Coordinates of the three-dimensional point in an image plane coordinate system are $P_m = (x_m, y_m, 1)^T$, where $$x_m = \frac{fx_c}{z_c}, \text{ and } y_m = \frac{fy_c}{z_c}.$$

It is assumed that a length and a width of a pixel are dx and dy respectively, and coordinates of the three-dimensional point in a pixel coordinate system are $$P_{pixel} = (u, v, 1)^T = \begin{bmatrix} \frac{1}{dx} & 0 & 0 \\ 0 & \frac{1}{dy} & 0 \\ 0 & 0 & 0 \end{bmatrix} \begin{bmatrix} x_m \\ y_m \\ 1 \end{bmatrix}.$$

For detailed descriptions of the intrinsics, the extrinsics, and the coordinate transformation matrices of the image sensor 1062 and the laser sensor 1061, refer to explanations and descriptions in conventional technologies. Details are not described herein again.

Figure 2:
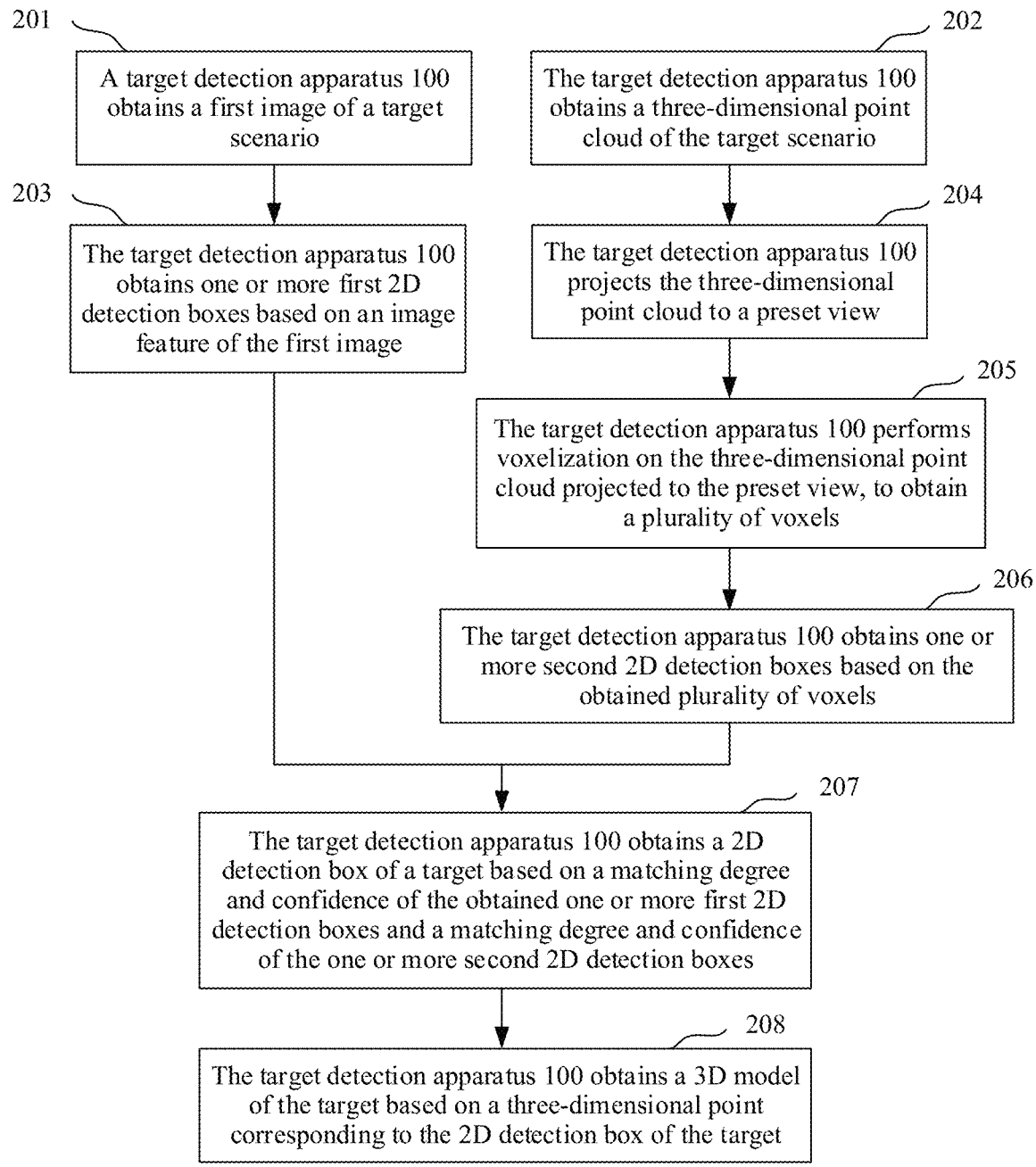
FIG. 2 is a flowchart of a target detection method according to an embodiment of this application.

The method provided in embodiments of this application may be performed by the target detection apparatus 100, or may be a sensor system, or a fusion sensor system, or a planning/control system integrating the foregoing sensor system or fusion sensor system, for example, a driver assistance system or an autonomous driving system. Alternatively, the method may be performed by software or hardware. Refer to FIG. 2. FIG. 2 describes a target detection method provided in an embodiment of this application by using an example in which an execution body is the target detection apparatus 100. As shown in FIG. 2, the target detection method provided in this embodiment of this application may include the following steps S201 to S208.

S201. The target detection apparatus 100 obtains a first image of a target scenario.

The target detection apparatus 100 obtains an image of the target scenario (namely, the first image) at a first moment. For example, the image sensor 1062 is a camera. The target detection apparatus 100 may invoke, at the first moment, a camera application installed in the target detection apparatus 100, to invoke the camera of the target detection apparatus 100, so as to obtain the first image of the target scenario. For example, the first image may be street views shown in FIG. 4 to FIG. 9.

S202. The target detection apparatus 100 obtains a three-dimensional point cloud of the target scenario.

For example, the target detection apparatus 100 may invoke the laser sensor 1061 at a second moment to obtain the three-dimensional point cloud of the target scenario. The first moment and the second moment may be a same moment or different moments.

For example, the laser sensor 1061 may scan the target scenario to obtain a three-dimensional point cloud including location information of a plurality of objects in the target scenario. Specifically, the laser sensor 1061 may transmit a laser pulse at a preset working frequency, and receive light reflected back after the laser pulse reaches one or more reflection points of another object, and then a reflection point cloud corresponding to the reflected light can be determined, for example, reflection point clouds shown in FIG. 5 to FIG. 9. The one or more reflection points may be represented by one or more three-dimensional points.

Each three-dimensional point may be represented by (x, y, z, r), where x, y, and z respectively represent coordinates of a corresponding three-dimensional point in a preset coordinate system, and r represents intensity of reflecting a laser beam from the laser sensor 1061 by a corresponding three-dimensional point. For example, the preset coordinate system may be a world coordinate system. The world coordinate system is a Cartesian coordinate system in which an origin is ow, an $x_w$ axis is horizontally rightward, a $y_w$ axis is downward, and a $z_w$ axis is determined according to the right-hand rule. For specific descriptions of the world coordinate system, refer to explanations and descriptions in conventional technologies. Details are not described herein again.

It should be noted that, as described above, both collecting the first image by the target detection apparatus 100 by using the image sensor 1062 and obtaining the three-dimensional point cloud of the target scenario by using the laser sensor 1061 may be performed at the first moment. In other words, the target detection apparatus 100 synchronously performs S201 by using the image sensor 1062 and performs S202 by using the laser sensor 1061.

In a possible implementation, the image sensor 1062 and the laser sensor 1061 may be controlled by a sync switch to synchronously perform S201 and S202. For example, the sync switch may be disposed in the processor 101.

In another possible implementation, the image sensor 1062 and the laser sensor 1061 may synchronously perform S201 and S202 based on a same timestamp (timestamp). A timestamp is usually a sequence of characters. The timestamp may uniquely identify a moment. For example, the timestamp may be generated by a digital time stamp service (digital time stamp service, DTS) module. For example, the DTS module may be disposed in the processor 101.

In another possible implementation, the image sensor 1062 and the laser sensor 1061 may synchronously perform S201 and S202 based on a same random number. The random number may uniquely identify a moment.

Alternatively, the image sensor 1062 and the laser sensor 1061 may synchronously perform S201 and S202 based on another synchronization manner. A synchronization manner is not limited in this embodiment of this application.

S203. The target detection apparatus 100 obtains one or more first 2D detection boxes based on an image feature of the first image.

Figure 5:
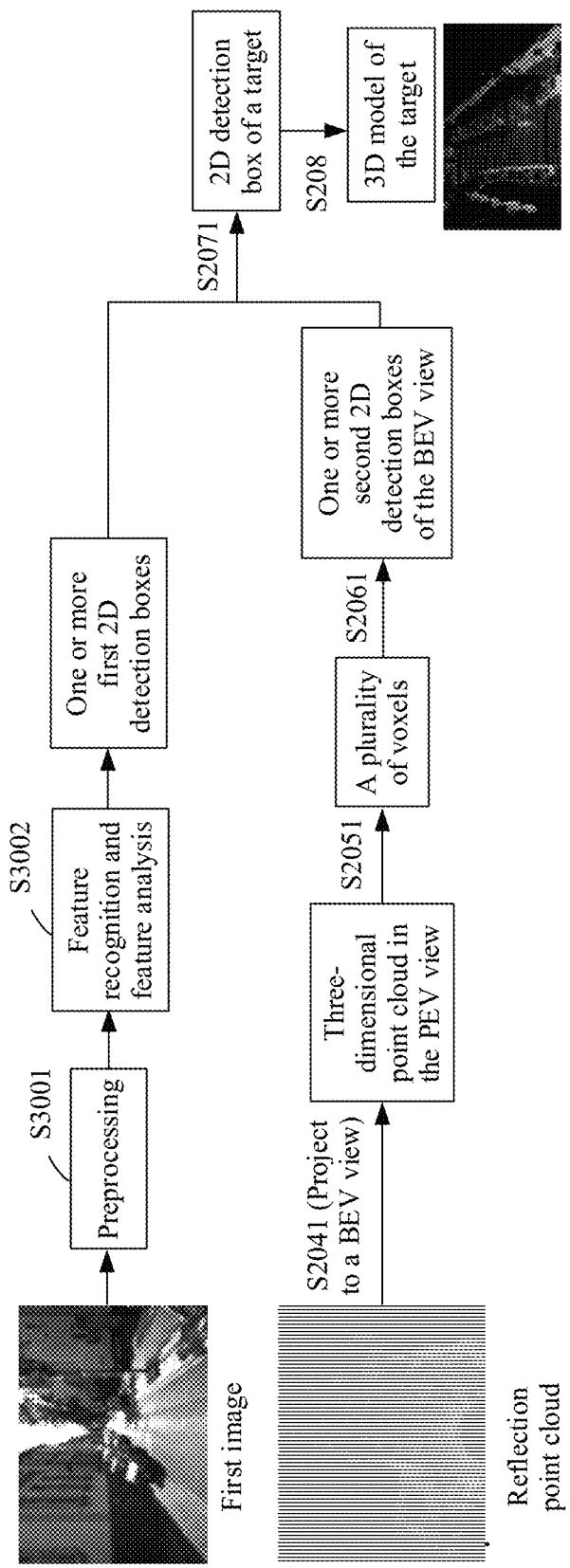
FIG. 5 is a first schematic diagram of a target detection method according to an embodiment of this application.

In some embodiments, as shown in S3001 and S3002 in FIG. 5, that the target detection apparatus 100 obtains one or more first 2D detection boxes based on an image feature of the first image may include: The target detection apparatus 100 preprocesses the first image; and the target detection apparatus 100 performs feature recognition and feature analysis on the preprocessed first image by using a neural network algorithm, to obtain the one or more first 2D detection boxes. Each first 2D detection box includes a plurality of image features of one target in the target scenario.

In this embodiment of this application, the image feature of the first image includes at least a feature that is highly likely to be concerned by a user in the first image, for example, a facial feature, a human body feature, a building feature, a feature of an object (such as a vehicle feature, an animal feature, a tree feature, and a flower feature), a river feature, and a mountain feature.

In some embodiments, preprocessing on the first image performed by the target detection apparatus 1001 may include: performing, by the target detection apparatus 100, one or more of denoising, grayscale processing, cropping, size change, or the like on the first image. Performing denoising on the first image is removing noise from the first image, so that variation of luminance of the first image is gradual, and a mutation gradient is reduced. In this way, quality of the first image can be improved. For example, a Gaussian filter may be used to denoise the first image. Performing grayscale processing on the first image is to process the first image based on grayscale values to transform the first image into an image whose luminance varies from white to gray, and then to black. A pixel whose grayscale value is 0 is displayed in white, and a pixel whose grayscale value is 255 is displayed in black. Grayscale processing is performed on the first image to reduce subsequent calculation. Cropping the first image is performed to reserve a main area of the first image, and remove an area with a small amount of information; or to facilitate subsequent calculation. For example, a size of the first image is 100*100 pixels, and an after-cropping size is 80*80 pixels. The size change of the first image may be used to assist in determining the main area of the first image, or facilitate subsequent calculation. For example, a size of the first image is 100*100 pixels, and a changed size is 150*150 pixels.

It should be noted that the foregoing denoising, grayscale processing, cropping, and size change are merely used as image preprocessing examples. For specific descriptions of image preprocessing, refer to explanations and descriptions in conventional technologies. This is not limited in this application.

For example, in this application, a convolutional neural network algorithm may be integrated into the NPU chip, and the target detection apparatus 100 may perform feature recognition and feature analysis on the first image by using the NPU chip, to obtain one or more first 2D detection boxes.

A convolutional neural network is a feedforward neural network, and artificial neurons of the convolutional neural network may respond to partial ambient units that are covered.

The convolutional neural network may include at least a data input layer, at least one convolutional layer, at least one pooling layer, and a fully connected layer. The data input layer is configured to preprocess to-be-processed data such as an obtained image, sound, and text. For example, preprocessing includes mean subtraction, normalization, and principal component analysis (principal component analysis, PCA)/whitening (whitening). The convolutional layer is used for feature extraction. The pooling layer is used for feature sampling, that is, replacing an area with a value, to reduce overfitting of a network training parameter and a model. The fully connected layer is used to perform comprehensive analysis on an extracted feature to obtain an analysis result. As described above, the convolutional neural network may further include a trained AI model.

Figure 3:
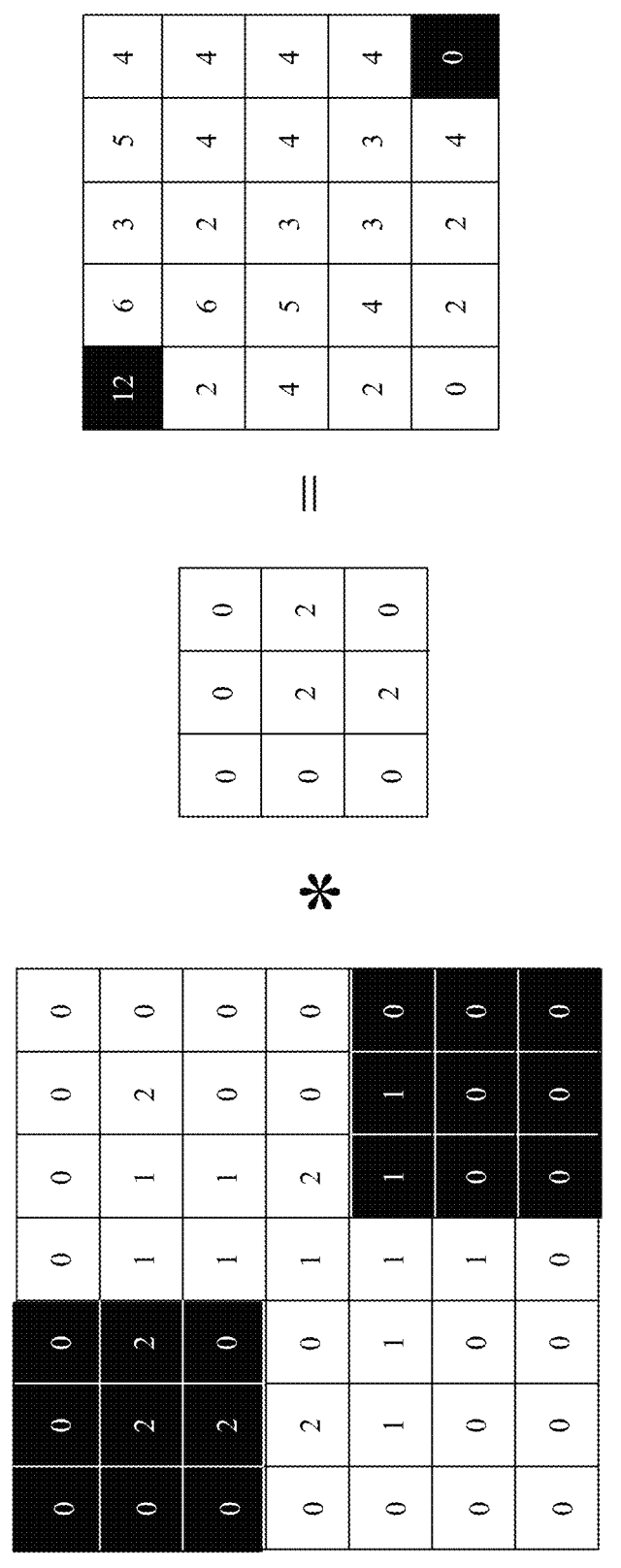

In the convolutional neural network, feature extraction performed by the convolutional layer may include: performing weighted summation by a filter continuously moving on an input image according to a slide, extracting feature information of an input feature matrix, and then performing data calculation on the feature matrix, as shown in FIG. 3.

In some embodiments, the convolutional neural network may further include an activation function layer that is configured to perform non-linear mapping on the feature extracted by the convolutional layer. For example, the activation function layer may compress, by using an activation function rectified linear unit (rectified linear unit, ReLU), a result output by the convolutional layer to a fixed range. In this way, a value range at each layer is controlled. The ReLU is characterized by fast convergence and simple gradient calculation.

Figure 4:
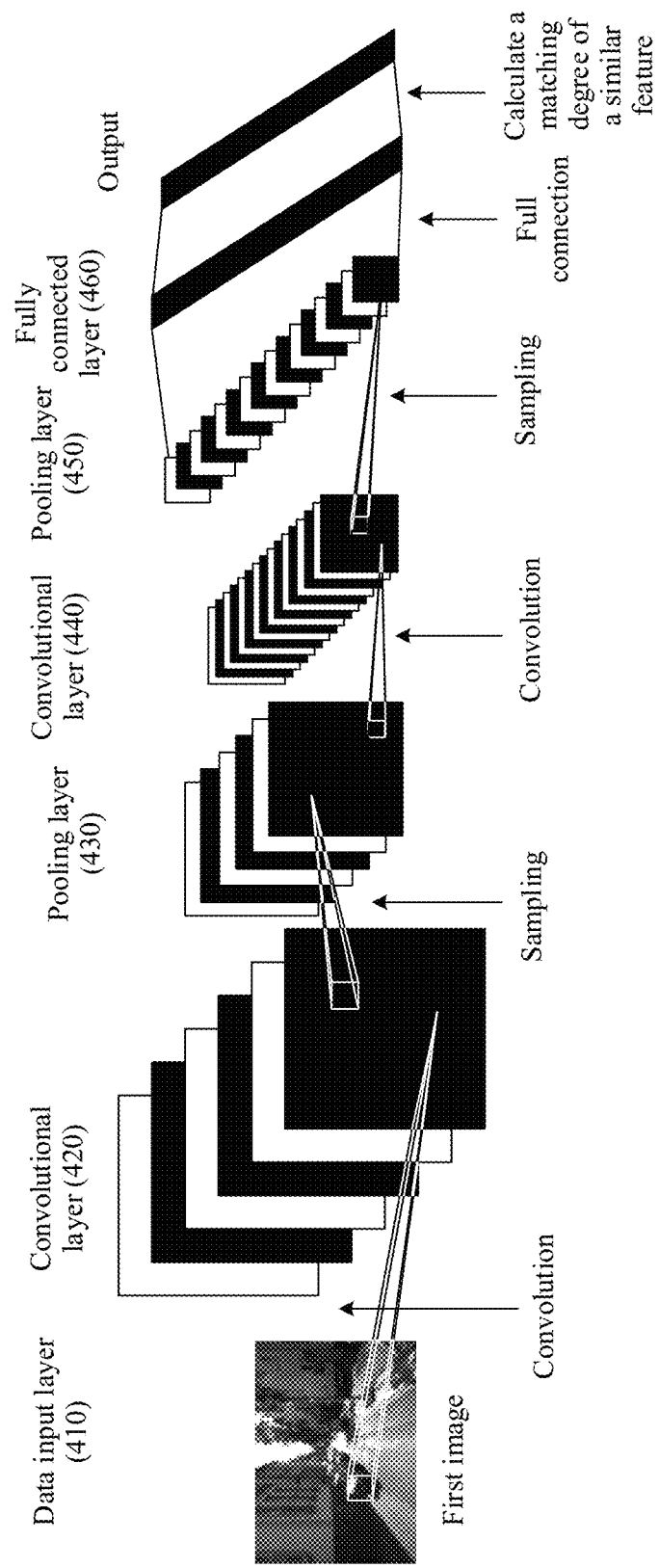
FIG. 4 is an example of analyzing a first image by a convolutional neural network according to an embodiment of this application.

FIG. 4 is an example diagram of analyzing a first image by a convolutional neural network according to an embodiment of this application. As shown in FIG. 4, the convolutional neural network may include a data input layer 410, a convolutional layer 420, a pooling layer 430, a convolutional layer 440, a pooling layer 450, and a fully connected layer 460. The data input layer 410 is configured to input the first image and preprocess the first image. A 28*28 image is obtained by performing convolution on a preprocessed image at the convolutional layer 420. A 14*14 image is obtained through pooling at the pooling layer 430. A 10*10 image is obtained through convolution at the convolutional layer 440. A 5*5 image is obtained at the pooling layer 450. The convolutional layer 420 may include six 5*5 kernels. The convolutional layer 440 may include sixteen 5*5 kernels. Finally, after a 5*5 image is obtained by using the pooling layer 450, a preset image feature similar to the first image feature and a feature matching degree corresponding to the preset image feature are obtained by using the fully connected layer 460. Further, a result is output based on each preset image feature similar to the first image feature and a feature matching degree corresponding to the preset image feature, and the result corresponds to a feature matching result of an AI model in a training set.

The convolutional neural network may be trained in advance before the target detection apparatus 100 is delivered from a factory, and is integrated to the target detection apparatus 100. Alternatively, photos taken by the target detection apparatus 100, or pictures received or downloaded by the target detection apparatus 100 in a preset time period may be used as the training set to perform specified training on the convolutional neural network, so that target detection performed by the convolutional neural network is accurate.

In some embodiments, to improve a speed and accuracy of analyzing the first image by the target detection apparatus 100, and to simplify the neural network, a lightweight neural network (for example, MobileNets or MobileNets V2) may be used to implement the target detection method in this embodiment of this application.

In some other embodiments, the target detection apparatus 100 may alternatively perform feature recognition and feature analysis on the preprocessed first image based on a conventional algorithm, for example, a conventional SIFT feature algorithm and a haar feature algorithm, to obtain one or more first 2D detection boxes. A method for image feature analysis of the first image is not limited in this embodiment of this application.

S204. The target detection apparatus 100 projects the three-dimensional point cloud to a preset view.

The target detection apparatus 100 may project the three-dimensional point cloud to the preset view according to a preset coordinate conversion matrix. For details, refer to descriptions in conventional technologies. Details are not described again.

In some embodiments, as shown in S2041 in FIG. 5, the target detection apparatus 100 may project the three-dimensional point cloud to a BEV view.

Figure 6:
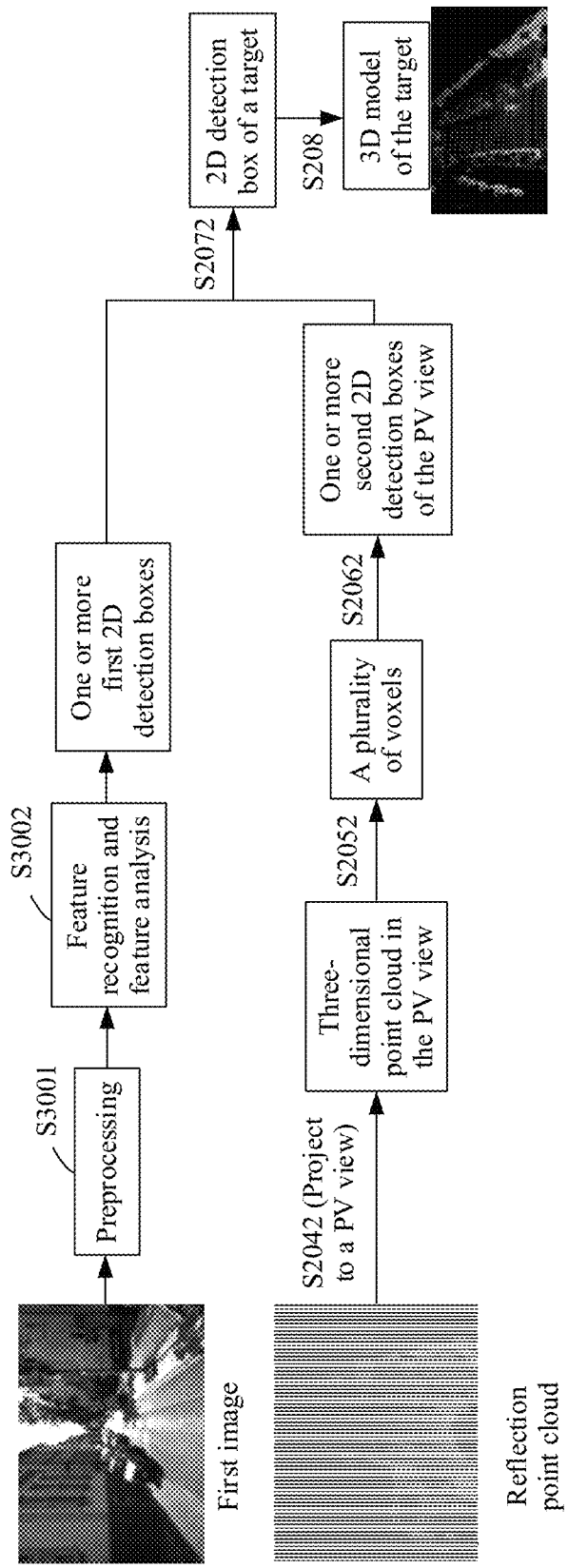
FIG. 6 is a second schematic diagram of a target detection method according to an embodiment of this application.

In some other embodiments, as shown in S2042 in FIG. 6, the target detection apparatus 100 may project the three-dimensional point cloud to a PV view.

Figure 7:
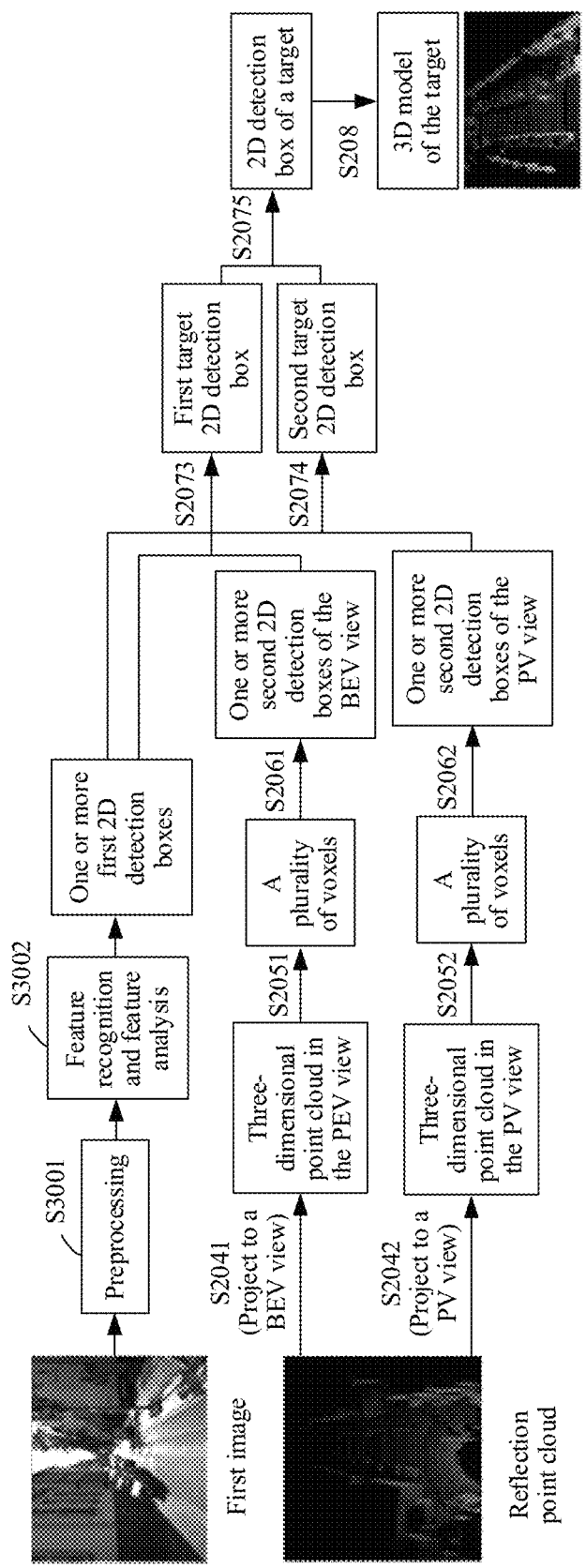
FIG. 7 is a third schematic diagram of a target detection method according to an embodiment of this application.
Figure 8:
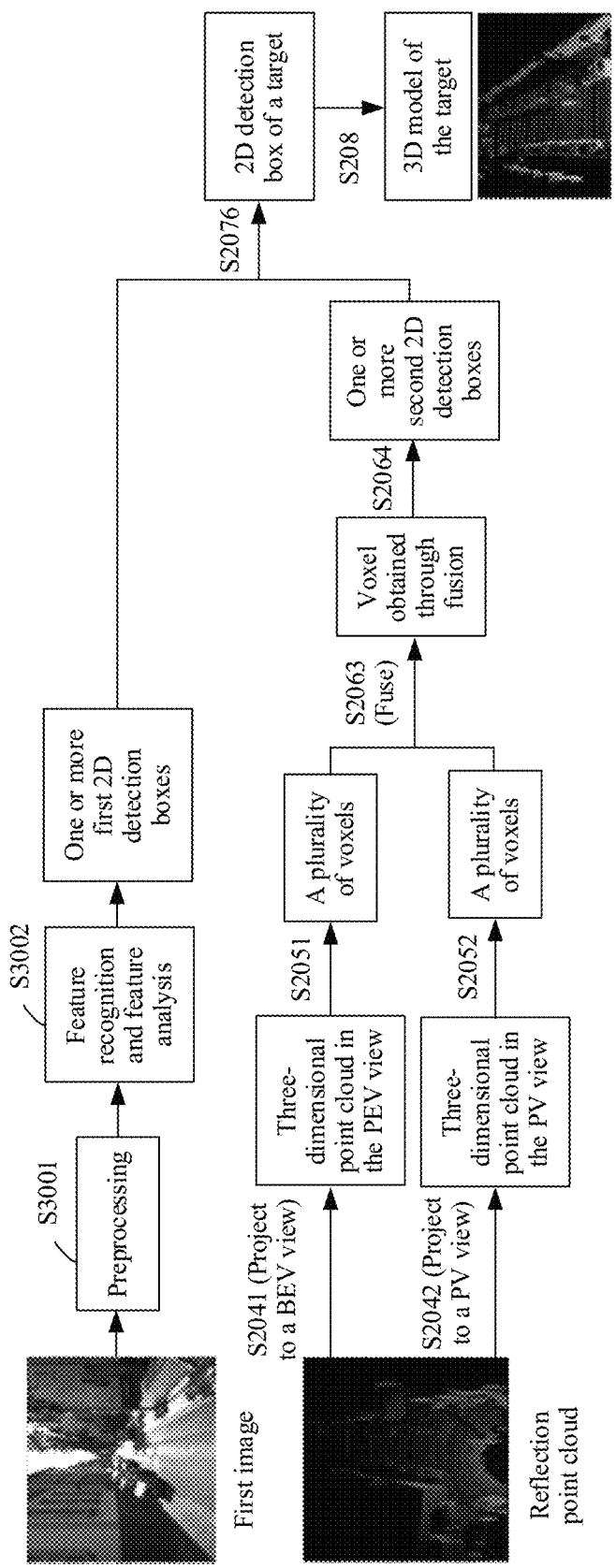
FIG. 8 is a fourth schematic diagram of a target detection method according to an embodiment of this application.
Figure 9:
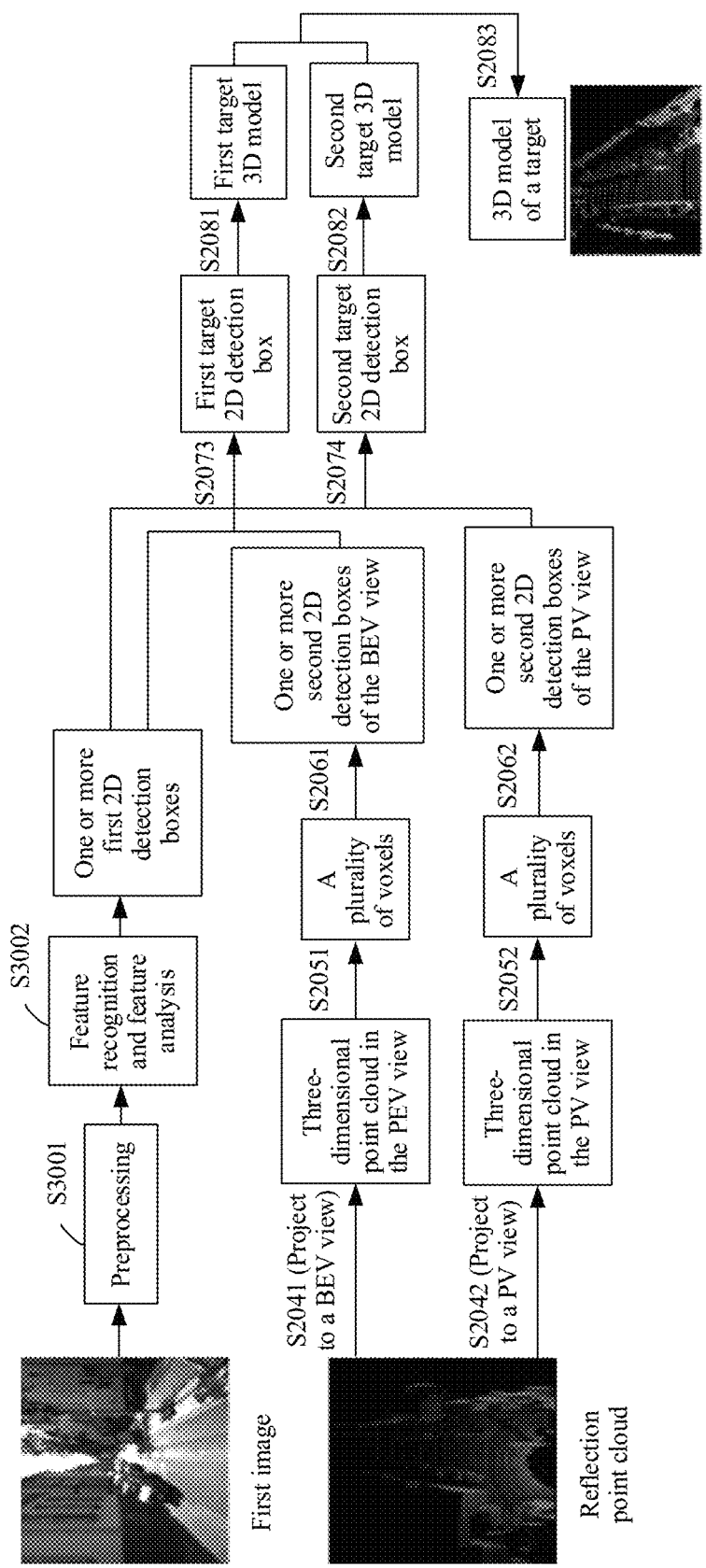
FIG. 9 is a fifth schematic diagram of a target detection method according to an embodiment of this application.

In some other embodiments, for example, as shown in S2041 and S2042 in FIG. 7, FIG. 8, or FIG. 9, the target detection apparatus 100 may project the three-dimensional point cloud to a BEV view and a PV view. The three-dimensional point cloud is projected to the BEV view and the PV view, so that voxels of the BEV view and voxels of the PV view can be subsequently fused for target detection. In this way, a shortcoming of sparse feature of the BEV view or the PV view can be addressed, and a distant target detection capability is improved.

S205. The target detection apparatus 100 performs voxelization on the three-dimensional point cloud projected to the preset view, to obtain a plurality of voxels.

The voxel is short for volume pixel (volume pixel), and is a minimum unit in three-dimensional space. For example, in the preset view, an area on which the three-dimensional point cloud is projected is evenly divided into M*N*K meshes, where M, N, and K are respective quantities of voxels along an x axis, a y axis, and a z axis. Based on concepts, voxel is similar to the smallest unit in two-dimensional space: pixel. The voxel may be understood as a feature block with a size in three-dimensional space. For example, the voxel may be a regular square, cuboid, sphere, or the like. A rule of voxelization and a specific shape of the voxel are not limited in this application.

For example, the voxel is a regular square. If the preset view includes a BEV view, the target detection apparatus 100 may evenly divide three-dimensional space in the Cartesian coordinate system into squares of an equal size. If the preset view includes the PV view, the target detection apparatus 100 needs to first transform the three-dimensional point cloud in the Cartesian coordinate system into a spherical coordinate system, and then perform voxelization to transform the three-dimensional point cloud in the spherical coordinate system into squares of an equal size.

It should be understood that, after the three-dimensional point cloud is voxelized, some voxels include a three-dimensional point, and some voxels do not include a three-dimensional point. A voxel that does not include a three-dimensional point definitely does not include a feature point, that is, does not include a feature point of a target. Therefore, the voxel that does not include a three-dimensional point may be ignored. Only a voxel including one or more three-dimensional points is retained. Therefore, each voxel obtained after the target detection apparatus 100 performs S205 includes one or more three-dimensional points.

In some embodiments, if the target detection apparatus 100 projects the three-dimensional point cloud to the BEV view in S204, the foregoing step S205 includes: The target detection apparatus 100 performs voxelization on the three-dimensional point cloud projected to the BEV view, to obtain a plurality of voxels of the BEV view, as shown in S2051 in FIG. 5.

In some other embodiments, if the target detection apparatus 100 projects the three-dimensional point cloud to the PV view in S204, the foregoing step S205 includes: The target detection apparatus 100 performs voxelization on the three-dimensional point cloud projected to the PV view, to obtain a plurality of voxels of the PV view, as shown in S2052 in FIG. 6.

In some other embodiments, if the target detection apparatus 100 projects the three-dimensional point cloud to the BEV view and the PV view in S204, the foregoing step S205 includes: The target detection apparatus 100 performs voxelization on the three-dimensional point cloud projected to the BEV view and the PV view, to obtain a plurality of voxels of the BEV view and a plurality of voxels of the PV view, as shown in S2051 and S2052 in FIG. 7, FIG. 8, or FIG. 9.

S206. The target detection apparatus 100 obtains one or more second 2D detection boxes based on the plurality of voxels.

A basic principle of obtaining, by the target detection apparatus 100, one or more second 2D detection boxes based on the obtained plurality of voxels is as follows: The target detection apparatus 100 obtains a spatial feature of each voxel, for example, obtains the spatial feature of each voxel by using a neural network algorithm; and then the target detection apparatus 100 obtains one or more second 2D detection boxes based on the spatial feature of each voxel. Detailed descriptions about a process in which the target detection apparatus 100 obtains the one or more second 2D detection boxes based on the obtained plurality of voxels is specifically described in the following explanations and descriptions of FIG. 10.

In some embodiments, if the target detection apparatus 100 projects the three-dimensional point cloud to the BEV view in S204, the foregoing step S206 may include: The target detection apparatus 100 analyzes the plurality of voxels of the BEV view, to obtain one or more second 2D detection boxes of the BEV view, as shown in S2061 in FIG. 5.

In some other embodiments, if the target detection apparatus 100 projects the three-dimensional point cloud to the PV view in S204, the foregoing step S206 may include: The target detection apparatus 100 analyzes the plurality of voxels of the PV view, to obtain one or more second 2D detection boxes of the PV view, as shown in S2062 in FIG. 6.

In some other embodiments, if the target detection apparatus 100 projects the three-dimensional point cloud to the BEV view and the PV view in S204, the foregoing step S206 may include: The target detection apparatus 100 analyzes the plurality of voxels of the BEV view and the plurality of voxels of the PV view, to obtain one or more second 2D detection boxes of the BEV view and one or more second 2D detection boxes of the PV view, as shown in S2061 and S2062 in FIG. 7.

Alternatively, if the target detection apparatus 100 projects the three-dimensional point cloud to the BEV view and the PV view in S204, the foregoing step S206 may include: The target detection apparatus 100 fuses the plurality of voxels of the BEV view and the plurality of voxels of the PV view. The target detection apparatus 100 obtains one or more second 2D detection boxes based on a voxel obtained through fusion, as shown in S2063 and S2064 in FIG. 8.

S207. The target detection apparatus 100 obtains a 2D detection box of a target based on a matching degree and confidence of the obtained one or more first 2D detection boxes and a matching degree and confidence of the one or more second 2D detection boxes.

The matching degree represents an overlapping degree of feature three-dimensional points corresponding to the first 2D detection box and the second 2D detection box. For example, if both the first 2D detection box and the second 2D detection box are second 2D detection boxes corresponding to a vehicle A, an overlapping degree of feature three-dimensional points in the two boxes is high, and a feature point of the vehicle A is included in both boxes. The confidence represents reliability of including a feature three-dimensional point by a corresponding first 2D detection box or second 2D detection box. For example, the confidence may be a percentage, where 100% indicates a high probability that the 2D detection box includes the feature three-dimensional point, and 1% indicates a low probability that the 2D detection box includes the feature three-dimensional point. For another example, the confidence may be a value from 1 to 10, where 10 indicates a high probability that the 2D detection box includes the feature three-dimensional point, and 1 indicates a low probability that the 2D detection box includes the feature three-dimensional point. A manner of representing the confidence is not limited in this application.

In some embodiments, if the target detection apparatus 100 projects the three-dimensional point cloud only to the BEV view in S204, the foregoing step S207 may include: The target detection apparatus 100 obtains the 2D detection box of the target based on the matching degree and the confidence of the obtained one or more first 2D detection boxes and a matching degree and confidence of the one or more second 2D detection boxes of the BEV view, as shown in S2071 in FIG. 5.

In some other embodiments, if the target detection apparatus 100 projects the three-dimensional point cloud to the PV view in S204, the foregoing step S207 may include: The target detection apparatus 100 obtains the 2D detection box of the target based on the matching degree and confidence of the obtained one or more first 2D detection boxes and a matching degree and confidence of the one or more second 2D detection boxes of the PV view, as shown in S2072 in FIG. 6.

In some other embodiments, if the target detection apparatus 100 projects the three-dimensional point cloud to the BEV view and the PV view in S204, the foregoing step S207 may include: The target detection apparatus 100 obtains a first target 2D detection box based on the matching degree and the confidence of the obtained one or more first 2D detection boxes and a matching degree and confidence of the one or more second 2D detection boxes of the BEV view, as shown in S2073 in FIG. 7; the target detection apparatus 100 obtains a second target 2D detection box based on the matching degree and the confidence of the obtained one or more first 2D detection boxes and the matching degree and the confidence of the one or more second 2D detection boxes of the PV view, as shown in S2074 in FIG. 7; and the target detection apparatus 100 obtains a 3D model of the target based on the obtained first target 2D detection box and second target 2D detection box. For example, as shown in S2075 in FIG. 7, the target detection apparatus 100 may fuse the obtained first target 2D detection box and second target 2D detection box to obtain the 2D detection box of the target.

Alternatively, as shown in FIG. 9, after the foregoing steps S2073 and S2074 are performed, the target detection apparatus 100 may further use the first target 2D detection box and the second target 2D detection box as 2D detection boxes of the target, and obtains a first target 3D model and a second target 3D model based on a three-dimensional point corresponding to the first target 2D detection box and a three-dimensional point corresponding to the second target 2D detection box respectively, as shown in S2081 and S2082.

For example, that the target detection apparatus 100 may fuse the obtained first target 2D detection box and second target 2D detection box to obtain the 2D detection box of the target may include: The target detection apparatus 100 determines a union of the first target 2D detection box and the second target 2D detection box, and uses the union as the 2D detection box of the target.

Alternatively, if the target detection apparatus 100 projects the three-dimensional point cloud to the BEV view and the PV view in S204, step S207 may include: The target detection apparatus 100 determines that the first target 2D detection box is the 2D detection box of the target, or that the second target 2D detection box is the 2D detection box of the target. For example, the target detection apparatus 100 may determine whether the 2D detection box of the target is the first target 2D detection box or the second target 2D detection box based on a quantity of three-dimensional points corresponding to the first target 2D detection box and a quantity of three-dimensional points corresponding to the second target 2D detection box, or the target detection apparatus 100 may randomly determine the 2D detection box of the target from the first target 2D detection box and the second target 2D detection box. This is not limited in this application.

Alternatively, if the target detection apparatus 100 projects the three-dimensional point cloud to the BEV view and the PV view in S204, and the target detection apparatus 100 fuses the plurality of voxels of the BEV view and the plurality of voxels of the PV view and obtains one or more second 2D detection boxes based on the voxel obtained through fusion in S206, the foregoing step S207 may include: The target detection apparatus 100 obtains the 2D detection box of the target based on the matching degree and the confidence of the obtained one or more first 2D detection boxes and a matching degree and confidence of one or more second 2D detection boxes obtained based on the voxel obtained through fusion, as shown in S2076 in FIG. 8.

By using an example in which the target detection apparatus 100 projects the three-dimensional point cloud only to the BEV view in S204, the following describes a principle and method for obtaining the first target 2D detection box, the second target 2D detection box, or the 2D detection box of the target by the target detection apparatus 100.

The foregoing step S207 may include: The target detection apparatus 100 obtains a confidence ranking of the one or more first 2D detection boxes and a confidence ranking of the one or more second 2D detection boxes of the BEV view. Then, the target detection apparatus 100 calculates intersection over union (intersection over union, IOU) between each first 2D detection box and each second 2D detection box of the BEV view based on the confidence rankings of the one or more first 2D detection boxes and the one or more second 2D detection boxes of the BEV view. If IOU is greater than a preset threshold, and confidence of a first 2D detection box is less than confidence of a second 2D detection box, the second 2D detection box is retained and the first 2D detection box is discarded.

In this embodiment of this application, the IOU may be understood as an overlapping rate between the second 2D detection box and the first 2D detection box, namely, a ratio of an intersection and a union of the second 2D detection box and the first 2D detection box. A value of the IOU is usually any value from 0 to 1. It may be understood that the second 2D detection box includes an object that is in the target scenario and that is detected by the target detection apparatus 100 by using the laser sensor, and the first 2D detection box includes an object that is in the target scenario and that is detected by the target detection apparatus 100 by using the image sensor.

If a ratio of an intersection and a union of the two is 1, or if the ratio of the intersection and the union of the two is greater than a preset threshold (for example, greater than a preset threshold 0.8), it indicates that the second 2D detection box and the first 2D detection box describe a same object. In this case, whether to retain the second 2D detection box or the first 2D detection box may be determined based on the confidence of the second 2D detection box and the confidence of the first 2D detection box. For example, the confidence of the first 2D detection box is less than the confidence of the second 2D detection box, the second 2D detection box is retained and the first 2D detection box is discarded. If the confidence of the first 2D detection box is equal to the confidence of the second 2D detection box, whether to retain the second 2D detection box or the first 2D detection box may be randomly determined. In another case, if the first 2D detection box is marked with a category label, the first 2D detection box may be retained. In another case, because the first image is rich in color information and texture information, the first 2D detection box obtained from the first image may be retained. This is not limited in this application.

If the ratio of the intersection and the union of the two is 0, it indicates that the second 2D detection box and the first 2D detection box do not describe a same object. In this case, a next second 2D detection box and a next first 2D detection box are processed.

If the ratio of the intersection and the union of the two is small (for example, less than a preset threshold 0.4), it indicates that the second 2D detection box and the first 2D detection box describe a same object, but miss detection by the image sensor may occur. In this case, a corresponding second 2D detection box needs to be retained. By using this method, a problem of missing detection of a target caused when the detection is performed only based on an image of the target scenario or a reflection point cloud of the target scenario can be addressed. For example, a target is not detected in image detection due to an FOV or an environmental factor (for example, a dark night, insufficient illumination, and rapid movement of the target).

Each first 2D detection box and each second 2D detection box of the BEV view are processed as described above, to obtain a retained final 2D detection box, namely, the 2D detection box of the target.

S208. The target detection apparatus 100 obtains the 3D model of the target based on a three-dimensional point corresponding to the 2D detection box of the target.

The three-dimensional point corresponding to the 2D detection box of the target is a three-dimensional point that is in the three-dimensional point cloud, of the target scenario, obtained by the laser sensor 1061 in step S202 and that is mapped to the 2D detection box of the target.

In a possible implementation, if the target detection apparatus 100 obtains the 2D detection box of the target, as shown in FIG. 5, FIG. 6, FIG. 7, and FIG. 8, the target detection apparatus 100 may directly obtain the 3D model of the target based on three-dimensional point corresponding to the 2D detection box of the target.

In another possible implementation, if the target detection apparatus 100 obtains the first target 2D detection box and the second target 2D detection box, the target detection apparatus 100 may obtain the first target 3D model and the second target 3D model based on the three-dimensional point corresponding to the first target 2D detection box and the three-dimensional point corresponding to the second target 2D detection box respectively, as shown in S2081 and S2082 in FIG. 9. Then, as shown in S2083 in FIG. 9, the target detection apparatus 100 may determine the 3D model of the target based on the first target 3D model and the second target 3D model. For example, the target detection apparatus 100 may determine, based on confidence of the first target 3D model and confidence of the second target 3D model, that the first target 3D model is the 3D model of the target, or that the second target 3D model is the 3D model of the target. A principle and a method for determining the 3D model of the target based on the confidence of the first target 3D model and the confidence of the second target 3D model are not limited in this application.

Figure 11:
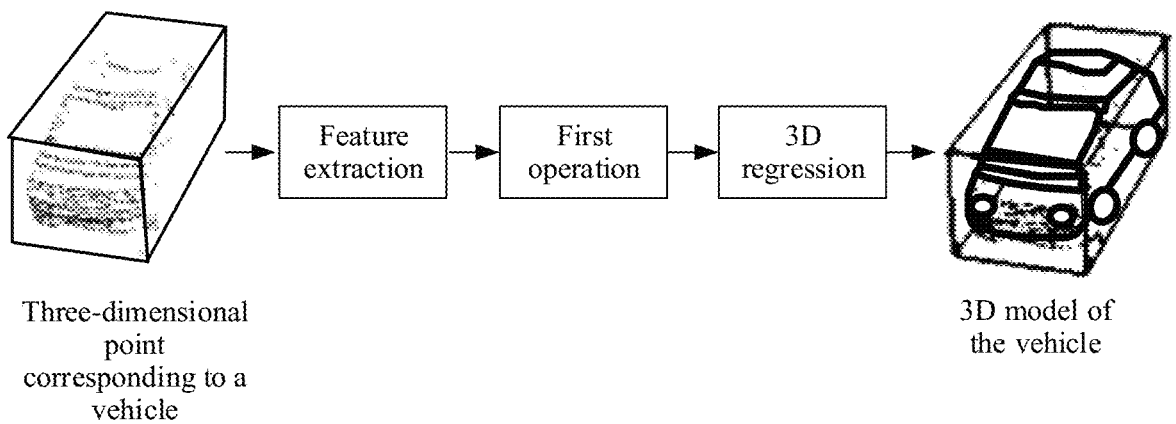
FIG. 11 is a schematic diagram of a method for obtaining a 3D model of a target based on a three-dimensional point corresponding to the target according to an embodiment of this application.

For example, the target detection apparatus 100 directly obtains the 3D model of the target based on the three-dimensional point corresponding to the 2D detection box of the target. In a possible implementation, step S208 may include: The target detection apparatus 100 determines the three-dimensional point corresponding to the 2D detection box of the target, obtains a feature of the three-dimensional point corresponding to the 2D detection box of the target, and obtains the feature three-dimensional point corresponding to the 2D detection box of the target; the target detection apparatus 100 performs one or more of first operations such as sampling, coordinate transformation, or foreground segmentation on the obtained feature three-dimensional point; and the target detection apparatus 100 obtains the 3D model of the target based on a feature three-dimensional point obtained by performing the first operation. As shown in FIG. 11, the three-dimensional point corresponding to the 2D detection box includes a three-dimensional point corresponding to a vehicle. Feature extraction is performed on the three-dimensional point corresponding to the vehicle, to obtain a feature three-dimensional point corresponding to the vehicle. The first operation (for example, sampling, coordinate transformation, or foreground segmentation) is performed on the feature three-dimensional point corresponding to the vehicle. Then 3D regression is further performed on the feature three-dimensional point on which the first operation is performed. In this way, a 3D model of the vehicle can be obtained.

An objective of sampling, coordinate transformation, or foreground segmentation is to extract, from feature three-dimensional points corresponding to the 2D detection box of the target, a feature three-dimensional point that is highly concerned, for example, a three-dimensional point corresponding to a foreground object, for example, a vehicle on a street in the first image shown in FIG. 4 to FIG. 9. For specific descriptions of sampling, coordinate transformation, or foreground segmentation, refer to explanations and descriptions in conventional technologies. Details are not described herein again.

In a possible implementation, the target detection apparatus 100 can determine the three-dimensional point corresponding to the 2D detection box of the target by using different methods based on different information sources. For example, when the 2D detection box of the target is the first 2D detection box, coordinates of the three-dimensional point cloud may be converted into an image coordinate system, to obtain a three-dimensional point that falls within the 2D detection box of the target, namely, the three-dimensional point corresponding to the 2D detection box of the target. For a case in which the 2D detection box of the target is the second 2D detection box, a three-dimensional point in a voxel corresponding to the 2D detection box of the target, namely, the three-dimensional point corresponding to the 2D detection box of the target, may be determined based on the mapping relationship between the three-dimensional point cloud and the voxels. The mapping relationship between the three-dimensional point cloud and the voxels indicates a voxel corresponding to each three-dimensional point.

In this embodiment of this application, a method for obtaining, by the target detection apparatus 100, the feature three-dimensional point corresponding to the 2D detection box of the target includes but is not limited to performing, by the target detection apparatus 100 by using a neural network algorithm or a conventional algorithm, feature recognition and feature analysis on the three-dimensional point corresponding to the 2D detection box of the target, to obtain a feature three-dimensional point matching a preset feature. For details, refer to foregoing descriptions. Details are not described again.

In addition, in this embodiment of this application, for a process of obtaining the 3D model of the target based on the feature three-dimensional point, refer to descriptions in conventional technologies, for example, 3D model construction and rendering performed by a GPU. Details are not described in this embodiment of this application.

Figure 10:
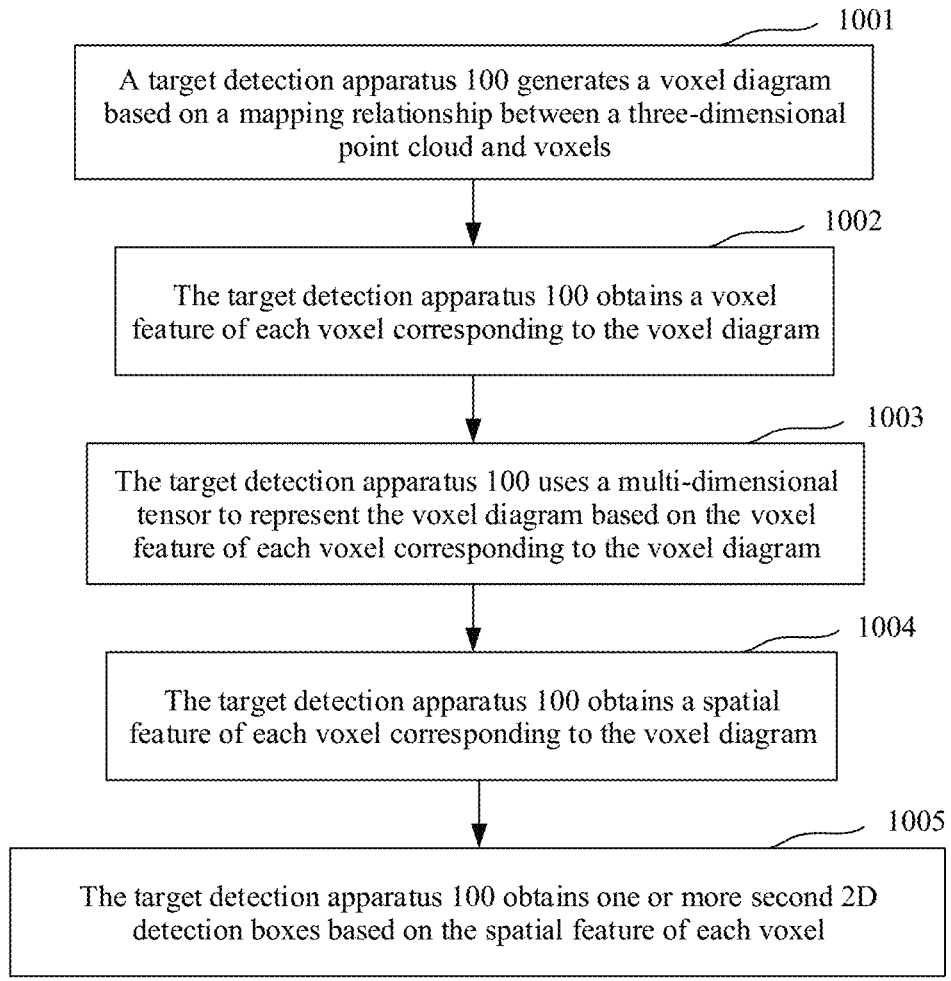
FIG. 10 is a schematic diagram of a method for obtaining a second 2D detection box based on a voxel according to an embodiment of this application.

If the target detection apparatus 100 projects the three-dimensional point cloud to the BEV view in S204, step S206 may include the following steps S1001 to S1005 as shown in FIG. 10.

S1001. The target detection apparatus 100 generates a voxel diagram based on the mapping relationship between the three-dimensional point cloud and the voxels.

The voxel diagram includes a plurality of voxels. Each voxel is a three-dimensional space. The voxel may include one or more three-dimensional points, or may not include three-dimensional points.

S1002. The target detection apparatus 100 obtains a voxel feature of each voxel corresponding to the voxel diagram.

The voxel feature of each voxel represents one or more of the following: a quantity of preset feature three-dimensional points in each voxel, whether there is a preset feature three-dimensional point in each voxel, or mean coordinates of preset feature three-dimensional points in each voxel. The preset feature three-dimensional point includes, but is not limited to, a three-dimensional point whose depth value difference from an ambient three-dimensional point is greater than a preset threshold, a three-dimensional point whose reflection intensity difference from an ambient three-dimensional point is greater than a preset threshold, a three-dimensional point whose reflection intensity is greater than a preset threshold, or the like. This is not limited in this application.

In a possible implementation, that the target detection apparatus 100 obtains a voxel feature of each voxel corresponding to the voxel diagram includes: The target detection apparatus 100 collects the quantity of the preset three-dimensional points in each voxel, and uses "0" or "1" or uses "no" or "yes", and the like to represent each voxel, where "0" and "no" indicate that there is no preset feature three-dimensional point in the voxel, and "1" and "yes" indicate that there is a preset feature three-dimensional point in the voxel. For example, a voxel feature of the voxel i is "0". The voxel feature represents that there is no preset feature three-dimensional point in the voxel i.

In another possible implementation, that the target detection apparatus 100 obtains a voxel feature of each voxel corresponding to the voxel diagram includes: The target detection apparatus 100 collects the quantity of the preset feature three-dimensional points in each voxel, and uses the quantity of the preset feature three-dimensional points in each voxel to represent the voxel. For example, the voxel feature of the voxel i is "38". The voxel feature represents that a quantity of the preset feature three-dimensional points in the voxel i is 38.

In another possible implementation, that the target detection apparatus 100 obtains a voxel feature of each voxel corresponding to the voxel diagram includes: The target detection apparatus 100 calculates the mean coordinates of the preset feature three-dimensional points in each voxel, and uses the mean coordinates to represent each voxel. For example, the voxel feature of the voxel i is (34, 55, 67). The voxel feature represents that mean coordinates of preset feature three-dimensional points in the voxel i is x=34, y=55, z=67.

In another possible implementation, that the target detection apparatus 100 obtains a voxel feature of each voxel corresponding to the voxel diagram includes: The target detection apparatus 100 collects the quantity of the preset feature three-dimensional points in each voxel, calculates the mean coordinates of the preset feature three-dimensional points in each voxel, and uses the quantity of the preset feature three-dimensional points in each voxel and the mean coordinates of the preset feature three-dimensional points to represent each voxel. For example, the voxel feature of the voxel i is (34, 55, 67, 38). The voxel feature represents that the quantity of the preset feature three-dimensional points in the voxel i is 38, and the mean coordinates of the preset feature three-dimensional points is x=34, y=55, z=67.

It should be noted that representing the quantity of the preset feature three-dimensional points in the voxel, whether there is a preset feature three-dimensional point in the voxel, or the mean coordinates of the preset feature three-dimensional points in the voxel are merely several examples of representation manners of the voxel feature. A representation manner of the voxel feature is not limited in this embodiment of this application. For example, the voxel feature may further represent a mean of the reflection intensity of the three-dimensional points in the voxel.

In some embodiments, the target detection apparatus 100 extracts the voxel feature of each voxel corresponding to the voxel diagram by using a neural network algorithm. For example, the target detection apparatus 100 may extract the voxel feature of each voxel by using a PointNet method. It may be understood that because spatial relationships are irregular during classification or segmentation of the three-dimensional point cloud, existing image classification and image segmentation frameworks cannot be directly applied to the three-dimensional point cloud, which results in voxelization of the three-dimensional point cloud (that is, transformation of the three-dimensional point cloud into a "mesh") and application of a voxelization deep learning framework. However, voxelization of the three-dimensional point cloud inevitably changes an original feature of three-dimensional point cloud data, which causes unnecessary data loss, and increases workload. Therefore, the PointNet method is introduced. As a point cloud classification/segmentation deep learning framework, the PointNet uses a manner of inputting an original three-dimensional point cloud, to retain a spatial feature of the three-dimensional point cloud as much as possible, and achieve a good analysis effect.

S1003. The target detection apparatus 100 obtains the voxel feature of each voxel corresponding to the voxel diagram, and use a multi-dimensional tensor to represent the voxel diagram.

For example, in a preset view, an area on which the three-dimensional point cloud is projected is evenly divided into M*N*K voxels, where each voxel is an L-dimensional tensor.

For example, a voxel feature of the voxel represents a quantity of preset feature three-dimensional points in the voxel and mean coordinates of the preset feature three-dimensional points, and the voxel diagram may be represented as a two-dimensional tensor. One dimension represents the quantity of the preset feature three-dimensional points in the voxel, and the other dimension represents the mean coordinates of the preset feature three-dimensional points in the voxel.

S1004. The target detection apparatus 100 obtains a spatial feature of each voxel corresponding to the voxel diagram.

It may be understood that when the voxel diagram is represented by the multi-dimensional tensor, the target detection apparatus 100 may extract the spatial feature of each voxel by using a neural network algorithm.

For example, in the preset view, the area on which the three-dimensional point cloud is projected is evenly divided into the M*N*K voxels, where each voxel is an L-dimensional tensor. In this case, the spatial feature of each voxel may be represented by the L-dimensional tensor. The voxel diagram may be represented by an M*N*K*L multi-dimensional tensor.

S1005. The target detection apparatus 100 obtains the one or more second 2D detection boxes based on the spatial feature of each voxel.

In a possible implementation, the target detection apparatus 100 may obtain the one or more second 2D detection boxes based on the spatial feature of each voxel by using a region proposal network (region proposal network, RPN).

The RPN is used to perform regression to obtain a bounding box of a foreground (including a foreground object) or a background (including a background object) in a target scenario by using some column convolution networks.

A working principle of the RPN mainly includes the following steps. First, an anchor box is determined based on the spatial feature of each voxel. Then, it is determined whether each anchor box is a foreground (foreground) or a background (background). Finally, each anchor box is fine-tuned through bounding box regression (bounding box regression), so that the anchor box is closer to an object in an actual scenario, namely, the second 2D detection box.

In some embodiments, by performing S1005, the target detection apparatus 100 may obtain one or more second 2D detection boxes corresponding to a foreground and a background.

In some other embodiments, by performing S1005, the target detection apparatus 100 may alternatively retain only one or more second 2D detection boxes corresponding to the foreground.

It is assumed that the target detection apparatus 100 is used as an apparatus for observing the target scenario. A background in the target scenario (for example, a road and a building in the target scenario corresponding to the first image shown in FIG. 4 to FIG. 9) usually remains unchanged, and an element noticed by the target detection apparatus 100 is usually an object moving in the target scenario, namely, a foreground object (for example, the vehicle in the target scenario corresponding to the first image shown in FIG. 4 to FIG. 9). Therefore, the target detection apparatus 100 may retain only the one or more second 2D detection boxes corresponding to the foreground.

Further, the target detection apparatus 100 may further obtain a category label corresponding to each second 2D detection box. Each category label represents a category of an object in a corresponding second 2D detection box, for example, a building, a road, or a vehicle.

For details about processes in which the target detection apparatus 100 obtains the one or more second 2D detection boxes of the PV view based on the obtained plurality of voxels of the PV view, and the target detection apparatus 100 obtains the one or more second 2D detection boxes based on a voxel collection obtained through fusing the plurality of voxels of the PV view and the plurality of voxels of the BEV view, refer to the foregoing steps S1001 to S1005. Details are not described herein again.

It should be understood that the solutions in embodiments of this application may be appropriately combined, and explanations or descriptions of terms in embodiments may be cross-referenced or explained in the embodiments. This is not limited.

It should be understood that sequence numbers of the foregoing processes do not mean execution sequences in various embodiments of this application. The execution sequences of the processes should be determined based on functions and internal logic of the processes, and should not be construed as any limitation on the implementation processes of embodiments of this application.

It may be understood that, to implement the functions in any of the foregoing embodiments, the target detection apparatus includes corresponding hardware structures and/or software modules for performing the functions. A person skilled in the art should be easily aware that, with reference to units and algorithm steps in the examples described in embodiments disclosed in this specification, this application can be implemented in a form of hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, function module division may be performed on the target detection apparatus. For example, each function module may be obtained through division based on each corresponding function, or two or more functions may be integrated into one processing module. The integrated module may be implemented in a form of hardware, or may be implemented in a form of a software function module. It should be noted that, in embodiments of this application, module division is an example, and is merely logical function division. In actual implementation, another division manner may be used.

Figure 12:
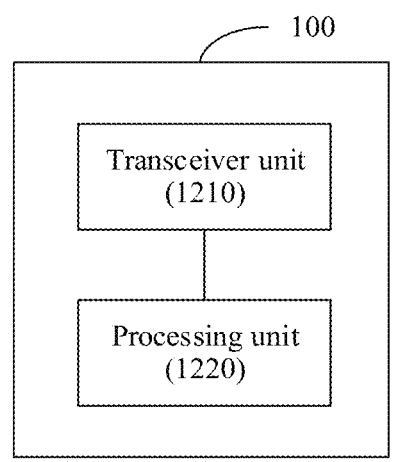
FIG. 12 is a schematic diagram of a structure of a target detection apparatus according to an embodiment of this application.

For example, in the case of function module division being performed based on integration, FIG. 12 is a block diagram of a structure of a target detection apparatus according to an embodiment of this application. The target detection apparatus 100 may include a transceiver unit 1210 and a processing unit 1220.

The transceiver unit 1210 is configured to assist the target detection apparatus 100 in performing step S202, and/or another process of the technology described in this specification, for example, transmitting a laser signal and receiving reflected laser light; or transmitting a radar signal and receiving a reflected radar signal. The processing unit 1220 is configured to support the target detection apparatus 100 in performing step S201, S202, S203, S204, S205, S206, S207, S208, S3001, S3002, S2041, S2051, S2061, S2071, S2042, S2052, S2062, S2072, S2073, S2074, S2075, S2063, S2064, S2076, S2081, S2082, S2083, S1001, S1002, S1003, S1004, or S1005, and/or another process of the technology described in this specification.

In an optional implementation, this application provides a sensor system or a fusion sensor system. The sensor system or the fusion sensor system includes one or more sensors. For example, the sensor system or the fusion sensor system may include one or more of an image sensor, a camera, an imaging radar, or the like; and include one or more of a laser sensor, a LiDAR sensor, a millimeter-wave radar, a sonar, an ultrasonic sensor, or the like.

Optionally, the sensor system or the fusion sensor system may be integrated into the target detection apparatus 100 or integrated into a planning/control system, for example, a driver assistance system or an autonomous driving system.

In an optional implementation, this application provides a target detection apparatus 100. The target detection apparatus 100 is configured to: obtain a first image and a three-dimensional point cloud of a target scenario from a third-party apparatus, and recognize a target in the target scenario based on the obtained first image and the three-dimensional point cloud of the target scenario. For example, the third-party apparatus may be a sensor system, a fusion sensor system, or the like.

In an optional implementation, this application provides a terminal device. The terminal device may be a transportation vehicle, a satellite, or an intelligent device, for example, an unmanned aerial vehicle, a driverless vehicle, a ship, a satellite, or a robot. Alternatively, the terminal device may be integrated into a transportation vehicle, a satellite, or an intelligent device, for example, integrated into a vehicle, an airplane, a ship, a satellite, or a robot. The terminal device includes one or more of the target detection apparatus 100, the sensor system, the fusion sensor system, and the planning/control system in embodiments of this application.

In an optional implementation, when software is used for implementing data transmission, the data transmission may be completely or partially implemented in a form of a computer program product. The computer program product includes one or more computer instructions. When the computer program instructions are loaded and executed on a computer, the procedures or functions according to embodiments of this application are completely or partially implemented. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired manner (for example, a coaxial cable, an optical fiber, or a digital subscriber line (Digital Subscriber Line, DSL)) or a wireless manner (for example, infrared, radio, and microwave, or the like). The computer-readable storage medium may be any usable medium accessible by a computer, or a data storage device, such as a server or a data center, integrating one or more usable media. The usable medium may be a magnetic medium (for example, a floppy disk, a hard disk drive, or a magnetic tape), an optical medium (for example, a digital video disk (Digital Video Disk, DVD)), a semiconductor medium (for example, a solid-state disk (Solid-State Disk, SSD)), or the like.

Method or algorithm steps described with reference to embodiments of this application may be implemented by hardware, or may be implemented by a processor by executing software instructions. The software instructions may include a corresponding software module. The software module may be stored in a RAM memory, a flash memory, a ROM memory, an EPROM memory, an EEPROM memory, a register, a hard disk drive, a removable hard disk, a CD-ROM memory, or a storage medium in any other form well-known in the art. For example, a storage medium is coupled to a processor, so that the processor can read information from the storage medium or write information into the storage medium. Certainly, the storage medium may be a component of the processor. The processor and the storage medium may be disposed in an ASIC. In addition, the ASIC may be located in a detection apparatus. Certainly, the processor and the storage medium may alternatively exist in the detection apparatus as discrete components.

The foregoing descriptions about implementations allow a person skilled in the art to understand that, for the purpose of convenience and brevity of description, division of the foregoing function modules is an example for illustration. In actual application, the foregoing functions can be allocated to different function modules for implementation based on requirements, in other words, an inner structure of the apparatus is divided into different function modules to implement all or some of the functions described above.

In a possible structure, the target detection apparatus 100 may include at least one processor and a communication interface. The at least one processor includes at least one of a CPU, a GPU, or a DSP.

Further, in a possible structure, the target detection apparatus 100 may further include at least one memory.

In an optional implementation, a chip system is provided in this application. The chip system includes a processor and a memory, where the memory stores computer program code, and when the computer program code is executed by a processing circuit or an integrated circuit, the method according to any possible implementation in this application is implemented. The chip system may include a chip, or may include a chip and another discrete component.

Optionally, the foregoing chip system may be integrated into the target detection apparatus 100. In the several embodiments provided in this application, it should be understood that the disclosed apparatus and method may be implemented in other manners. For example, the foregoing apparatus embodiments are merely examples. For example, division of the modules or units is merely logical function division. In actual implementation, there may be another division manner. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may be one or more physical units, in other words, may be located in one place, or may be distributed on different places. Some or all of the units may be selected based on actual requirements to achieve the objectives of the solutions of the embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the methods described in embodiments of this application. The foregoing storage medium includes any medium that can store program code, for example, a USB flash drive, a removable hard disk, a ROM, a RAM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A target detection method, wherein the method comprises:
    obtaining a first image and a three-dimensional (3D) point cloud of a target scenario;
    obtaining one or more first two-dimensional (2D) detection boxes based on an image feature in the first image;
    projecting the 3D point cloud to a preset view that comprises a bird eye view (BEV) and a perspective view (PV);
    performing voxelization on the 3D point cloud projected to the preset view, to obtain a plurality of voxels each comprising one or more 3D points;
    obtaining one or more second 2D detection boxes based on the plurality of voxels;
    obtaining a 2D detection box of a target based on a matching degree and confidence of the one or more first 2D detection boxes and a matching degree and confidence of the one or more second 2D detection boxes, wherein the confidence represents reliability of having a feature 3D point included by a corresponding first 2D detection box or second 2D detection box; and
    obtaining a 3D model of the target based on a 3D point corresponding to the 2D detection box of the target.

2. The method according to claim 1, wherein obtaining one or more second 2D detection boxes based on the plurality of voxels comprises:
    generating a voxel diagram based on a mapping relationship between the 3D point cloud and the plurality of voxels;
    obtaining a voxel feature of each of the plurality of voxels corresponding to the voxel diagram, wherein the voxel feature represents one or more of the following: a quantity of preset feature 3D points in the voxel, whether there is a preset feature 3D point in the voxel, or mean coordinates of the preset feature 3D points in the voxel;
    using a multi-dimensional tensor to represent the voxel diagram based on the voxel feature of each of the plurality of voxels corresponding to the voxel diagram;
    obtaining a spatial feature of each of the plurality of voxels corresponding to the voxel diagram; and
    obtaining the one or more second 2D detection boxes based on the spatial feature of each of the plurality of voxels.

3. The method according to claim 1, obtaining the 3D model of the target based on a 3D point corresponding to the 2D detection box of the target comprises:
    obtaining a feature of the 3D point corresponding to the 2D detection box of the target, to obtain a feature 3D point corresponding to the 2D detection box of the target;
    performing a first operation on the feature 3D point, wherein the first operation comprises one or more of sampling, coordinate transformation, or foreground segmentation; and
    obtaining the 3D model of the target based on a feature 3D point obtained by performing the first operation.

4. The method according to claim 1, wherein obtaining the 2D detection box of the target comprises:
    obtaining confidence rankings of the one or more first 2D detection boxes and the one or more second 2D detection boxes;
    calculating intersection over union (IOU) between each of the one or more first 2D detection boxes and each of the second 2D detection boxes based on the confidence rankings; and
    in response to determining that the IOU is greater than a preset threshold and confidence of a first 2D detection box is less than confidence of a second 2D detection box, retaining the second 2D detection box and discarding the first 2D detection box.

5. The method according to claim 1, wherein performing voxelization on the 3D point cloud projected to the preset view, to obtain the plurality of voxels comprises:
    performing voxelization on the 3D point cloud projected to the BEV view, to obtain a plurality of voxels of the BEV view; and
    performing voxelization on the 3D point cloud projected to the PV view, to obtain a plurality of voxels of the PV view.

6. The method according to claim 5, wherein obtaining the one or more second 2D detection boxes based on the plurality of voxels comprises:
    fusing the plurality of voxels of the BEV view and the plurality of voxels of the PV view to generate fusion; and
    obtaining the one or more second 2D detection boxes based on a voxel obtained through the fusion.

7. The method according to claim 5, wherein obtaining the one or more second 2D detection boxes based on the plurality of voxels comprises:
    obtaining one or more second 2D detection boxes of the BEV view based on the plurality of voxels of the BEV view, and obtaining one or more second 2D detection boxes of the PV view based on the plurality of voxels of the PV view; and wherein
        obtaining the 2D detection box of the target comprises:
            obtaining a first target 2D detection box based on the matching degree and the confidence of the one or more first 2D detection boxes and a matching degree and confidence of the one or more second 2D detection boxes of the BEV view, and obtaining a second target 2D detection box based on the matching degree and the confidence of the one or more first 2D detection boxes and a matching degree and confidence of the one or more second 2D detection boxes of the PV view; and obtaining the 2D detection box of the target based on the first target 2D detection box and the second target 2D detection box.

8. The method according to claim 7, wherein the 2D detection box of the target is the first target 2D detection box or the second target 2D detection box.

9. The method according to claim 7, wherein obtaining the 2D detection box of the target comprises:

fusing the first target 2D detection box and the second target 2D detection box to obtain the 2D detection box of the target.

10. The method according to claim 1, wherein the 3D model of the target represents one or more of a location, a structure, or a category of the target.

11. An apparatus, comprising:
at least one processor; and
a memory coupled to the at least one processor and storing instructions for execution by the at least one processor to cause the apparatus to:
obtain a first image and a three-dimensional (3D) point cloud of a target scenario;
obtain one or more first two-dimensional (2D) detection boxes based on an image feature in the first image;
project the 3D point cloud to a preset view that comprises a bird eye view (BEV) and a perspective view (PV);
perform voxelization on the 3D point cloud projected to the preset view, to obtain a plurality of voxels each comprising one or more 3D points;
obtain one or more second 2D detection boxes based on the plurality of voxels;
obtain a 2D detection box of a target based on a matching degree and confidence of the one or more first 2D detection boxes and a matching degree and confidence of the one or more second 2D detection boxes, wherein the confidence represents reliability of having a feature 3D point included by a corresponding first 2D detection box or second 2D detection box; and
obtain a 3D model of the target based on a 3D point corresponding to the 2D detection box of the target.

12. The apparatus according to claim 11, wherein obtain one or more second 2D detection boxes based on the plurality of voxels comprises:
generate a voxel diagram based on a mapping relationship between the 3D point cloud and the plurality of voxels;
obtain a voxel feature of each of the plurality of voxels corresponding to the voxel diagram, wherein the voxel feature represents one or more of the following: a quantity of preset feature 3D points in the voxel, whether there is a preset feature 3D point in the voxel, or mean coordinates of the preset feature 3D points in the voxel;
use a multi-dimensional tensor to represent the voxel diagram based on the voxel feature of each of the plurality of voxels corresponding to the voxel diagram;
obtain a spatial feature of each of the plurality of voxels corresponding to the voxel diagram; and
obtain the one or more second 2D detection boxes based on the spatial feature of each of the plurality of voxels.

13. The apparatus according to claim 11, obtain the 3D model of the target based on a 3D point corresponding to the 2D detection box of the target comprises:

obtain a feature of the 3D point corresponding to the 2D detection box of the target, to obtain a feature 3D point corresponding to the 2D detection box of the target;
perform a first operation on the feature 3D point, wherein the first operation comprises one or more of sampling, coordinate transformation, or foreground segmentation; and
obtain the 3D model of the target based on a feature 3D point obtained by performing the first operation.

14. The apparatus according to claim 11, wherein obtain the 2D detection box of the target comprises:
obtain confidence rankings of the one or more first 2D detection boxes and the one or more second 2D detection boxes;
calculate intersection over union (IOU) between each of the one or more first 2D detection boxes and each of the second 2D detection boxes based on the confidence rankings; and
in response to determining that the IOU is greater than a preset threshold and confidence of a first 2D detection box is less than confidence of a second 2D detection box, retain the second 2D detection box and discarding the first 2D detection box.

15. The apparatus according to claim 11, wherein perform voxelization on the 3D point cloud projected to the preset view, to obtain the plurality of voxels comprises:
perform voxelization on the 3D point cloud projected to the BEV view, to obtain a plurality of voxels of the BEV view; and
perform voxelization on the 3D point cloud projected to the PV view, to obtain a plurality of voxels of the PV view.

16. The apparatus according to claim 15, wherein obtain the one or more second 2D detection boxes based on the plurality of voxels comprises:
fuse the plurality of voxels of the BEV view and the plurality of voxels of the PV view to generate fusion; and
obtain the one or more second 2D detection boxes based on a voxel obtained through the fusion.

17. The apparatus according to claim 15, wherein obtain the one or more second 2D detection boxes based on the plurality of voxels comprises:
obtain one or more second 2D detection boxes of the BEV view based on the plurality of voxels of the BEV view, and obtain one or more second 2D detection boxes of the PV view based on the plurality of voxels of the PV view; and wherein
obtain the 2D detection box of the target comprises:
obtain a first target 2D detection box based on the matching degree and the confidence of the one or more first 2D detection boxes and a matching degree and confidence of the one or more second 2D detection boxes of the BEV view, and obtain a second target 2D detection box based on the matching degree and the confidence of the one or more first 2D detection boxes and a matching degree and confidence of the one or more second 2D detection boxes of the PV view; and
obtain the 2D detection box of the target based on the first target 2D detection box and the second target 2D detection box.

18. The apparatus according to claim 17, wherein the 2D detection box of the target is the first target 2D detection box or the second target 2D detection box.

19. The apparatus according to claim 17, wherein obtain the 2D detection box of the target comprises:

fuse the first target 2D detection box and the second target 2D detection box to obtain the 2D detection box of the target.

20. The apparatus according to claim 11, wherein the 3D model of the target represents one or more of a location, a structure, or a category of the target.

\* \* \* \* \*